United States Patent
Li et al.

(10) Patent No.: US 9,659,259 B2
(45) Date of Patent: May 23, 2017

(54) LATENCY-EFFICIENT MULTI-STAGE TAGGING MECHANISM

(71) Applicant: Microsoft Technology Licensing, LLC, Redmond, WA (US)

(72) Inventors: Min Li, Sunnyvale, CA (US); Ruofei Zhang, Mountain View, CA (US); Muhammad Adnan Alam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 26 days.

(21) Appl. No.: 14/578,424

(22) Filed: Dec. 20, 2014

(65) Prior Publication Data

US 2016/0180247 A1 Jun. 23, 2016

(51) Int. Cl.
*G06F 17/27* (2006.01)
*G06N 99/00* (2010.01)
*G06F 17/30* (2006.01)
*G06Q 30/02* (2012.01)

(52) U.S. Cl.
CPC ..... *G06N 99/005* (2013.01); *G06F 17/30864* (2013.01); *G06Q 30/0277* (2013.01)

(58) Field of Classification Search
USPC ...................................................... 704/7–10
See application file for complete search history.

(56) References Cited

U.S. PATENT DOCUMENTS

| | | | |
|---|---|---|---|
| 8,762,384 B2 | 6/2014 | Heidasch | |
| 9,195,934 B1 * | 11/2015 | Hunt | G06N 3/02 |
| 2007/0011154 A1 * | 1/2007 | Musgrove | G06F 17/2785 |
| 2010/0121638 A1 * | 5/2010 | Pinson | G10L 15/02 704/235 |
| 2010/0268725 A1 | 10/2010 | Wang et al. | |

(Continued)

FOREIGN PATENT DOCUMENTS

WO 2006083684 A2 8/2006

OTHER PUBLICATIONS

Li, et al., "Extracting Structured Information from User Queries with Semi-Supervised Conditional Random Fields," in Proceedings of the 32nd International ACM SIGIR Conference on Research and Development in Information Retrieval, Jul. 2009, 8 pages.

(Continued)

*Primary Examiner* — Leonard Saint Cyr

(57) ABSTRACT

Functionality is described herein for analyzing an input linguistic item, such as a query, in a series of stages. The linguistic item includes one or more candidate items. In a first stage, a brand classifier component determines whether the linguistic item specifies at least one brand, to provide a classifier output result. In a second stage, a tagging component generates a set of tags for at least some of the candidate items in the linguistic item, based, in part, on the classifier output result, to generate a tagging output result. An action-taking component then generates at least one result item based on the tagging output result. Functionality is also described herein for producing the brand classifier component and the tagging component using machine-learning training techniques. The training techniques may include provisions to address the later appearance of new brands that do not appear in a brand dictionary.

20 Claims, 14 Drawing Sheets

(56) References Cited

U.S. PATENT DOCUMENTS

| | | | |
|---|---|---|---|
| 2011/0125791 A1* | 5/2011 | Konig ............... | G06F 17/30864 707/770 |
| 2011/0184893 A1 | 7/2011 | Paparizos et al. | |
| 2011/0270815 A1 | 11/2011 | Li | |
| 2014/0236575 A1 | 8/2014 | Tur et al. | |

OTHER PUBLICATIONS

Sarkas, et al., "Structured Annotations of Web Queries," in Proceedings of the 2010 ACM SIGMOD International Conference on Management of Data, Jun. 2010, 12 pages.

Callan, et al., "Knowledge-Based Extraction of Named Entities," in Proceedings of the Eleventh International Conference on Information and Knowledge Management, Nov. 2002, 6 pages.

Wang, et al., "Semi-Supervised Learning of Semantic Classes for Query Understanding—from the Web and for the Web," Proceedings of the 18th ACM Conference on Information and Knowledge Management, Nov. 2009, 10 pages.

Paparizos, et al., "Answering Web Queries Using Structured Data Sources," in Proceedings of the 2009 ACM SIGMOD International Conference on Management of Data, Jun. 2009, 3 pages.

Li, Xiao, "Understanding the Semantic Structure of Noun Phrase Queries," in Proceedings of the 48th Annual Meeting of the Association for Computational Linguistics, Jul. 2010, 9 pages.

Celikyilmaz, et al., "Semi-Supervised Semantic Tagging of Conversational Understanding using Markov Topic Regression," in Proceedings of the 51st Annual Meeting of the Association for Computational Linguistics, Aug. 2013, 10 pages.

Singh, et al., "Minimally-Supervised Extraction of Entities from Text Advertisements," in Proceedings of Human Language Technologies: The Annual Conference of the North American Chapter of the Association for Computational Linguistics, Jun. 2010, 9 pages.

Joyee, et al., "Structured Annotations of Queries," available at <<http://nlp.stanford.edu/courses/cs224n/2011/reports/joyee-ppapadim.pdf>>, retrieved on Oct. 13, 2014, 6 pages.

Liu, et al., "Lexicon Modeling for Query Understanding", in Proceedings of the IEEE International Conference on Acoustics, Speech, and Signal Processing, May 2011, 4 pages.

"International Search Report and Written Opinion Issued in PCT Application No. PCT/US2015/066217", Mailed Date: Mar. 17, 2016, 12 Pages.

Shen, et al., "Query enrichment for Web-query Classification", In Proceedings of the ACM Transactions on Information Systems, vol. 24, Issue 3, Jul. 1, 2006, pp. 320-352.

Guo, et al., "Named Entity Recognition in Query", In Proceedings of the 32nd international ACM SIGIR conference on Research and development in information retrieval, Jan. 1, 2009, pp. 267-274.

"Second Written Opinion Issued in PCT Application No. PCT/US2015/066217", Mailed Date: Nov. 4, 2016, 7 Pages.

\* cited by examiner

LATENCY-EFFICIENT MULTI-STAGE TAGGING MECHANISM

BACKGROUND

Some search engines may use a mechanism for annotating at least some words of a query with respective labels. In one approach, a search engine may perform this labeling task by consulting static fact tables or a static knowledge base. In another, separate, approach, the search engine may perform the labeling task solely using a sequential model, such as a conditional random field (CRF) model. While the above techniques may provide useful results in some cases, there is room for further improvement in these techniques.

SUMMARY

An intent determination component is described herein which analyzes an input linguistic item, such as a query, in a series of stages. In a first stage, a machine-trained brand classifier component determines whether the linguistic item specifies at least one brand, to provide a classier output result. In a second stage, a machine-trained tagging component generates a set of tags for candidate items (e.g., words) within the linguistic item, based, in part, on the classifier output result; this operation yields a tagging output result. An action-taking component then generates at least one result item based on the tagging output result.

For example, in one environment, a search engine may implement the intent determination component and the action-taking component. In that context, the result item may correspond to a digital product page, a digital advertisement, a search result page that contains a compilation of search result items, etc., or any combination thereof.

According to one illustrative aspect, a feature generation component generates a plurality of feature values for use by the brand classifier component and the tagging component. The feature generation component performs this task such that feature values that are used by both the brand classifier component and the tagging component are only generated once. This provision reduces latency in the operation of the intent determination component.

According to another illustrative aspect, the intent determination component may analyze user intent for a plurality of domains. The brand classifier component includes a plurality of classifier subcomponents for the respective domains, and the tagging component includes a plurality of tagging subcomponents for the respective domains.

According to another illustrative aspect, a training system is also described herein for using machine-learning techniques to produce at least one brand model for use by the brand classifier component, and to produce at least one tagging model for use by the tagging component.

According to another illustrative aspect, a machine-learning technique for generating a brand model may incorporate various provisions to address the introduction of new brands in queries that are not accounted for in a brand dictionary. Further, that machine-learning technique may "hide" at least some entries in the brand dictionary during the training operation, thus making the model that is produced more robust to the interpretation of new brands that may appear in queries.

The above approach can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative systems for annotating a linguistic item using a multi-stage process. Section B sets forth illustrative methods which explain the operation of the systems of Section A. Section C describes illustrative computing functionality that can be used to implement any aspect of the features described in Sections A and B.

Figure 16:
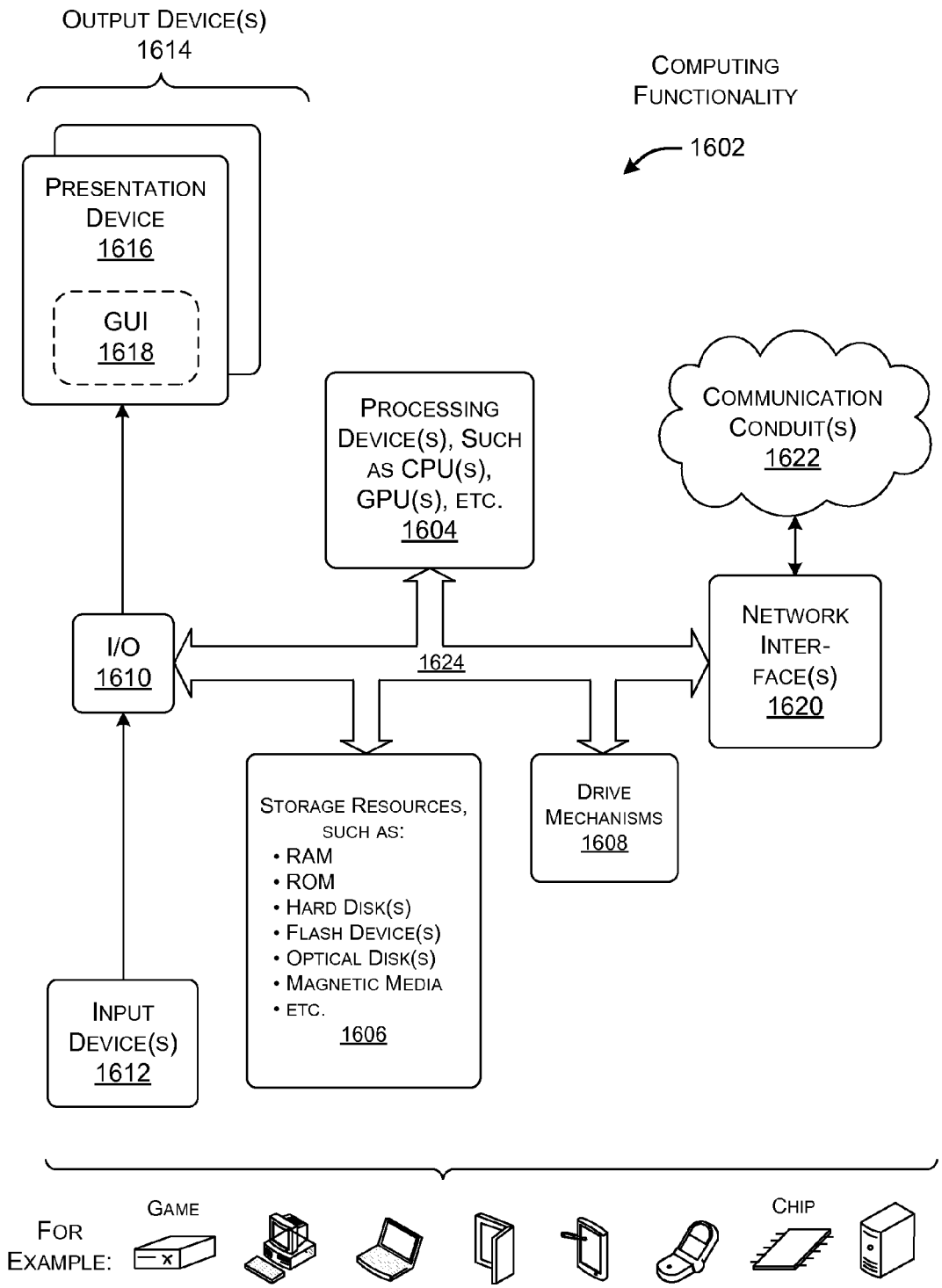
FIG. 16 shows illustrative computing functionality that can be used to implement any aspect of the components and operations shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 16, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, in whatever manner implemented.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

Figure 1:
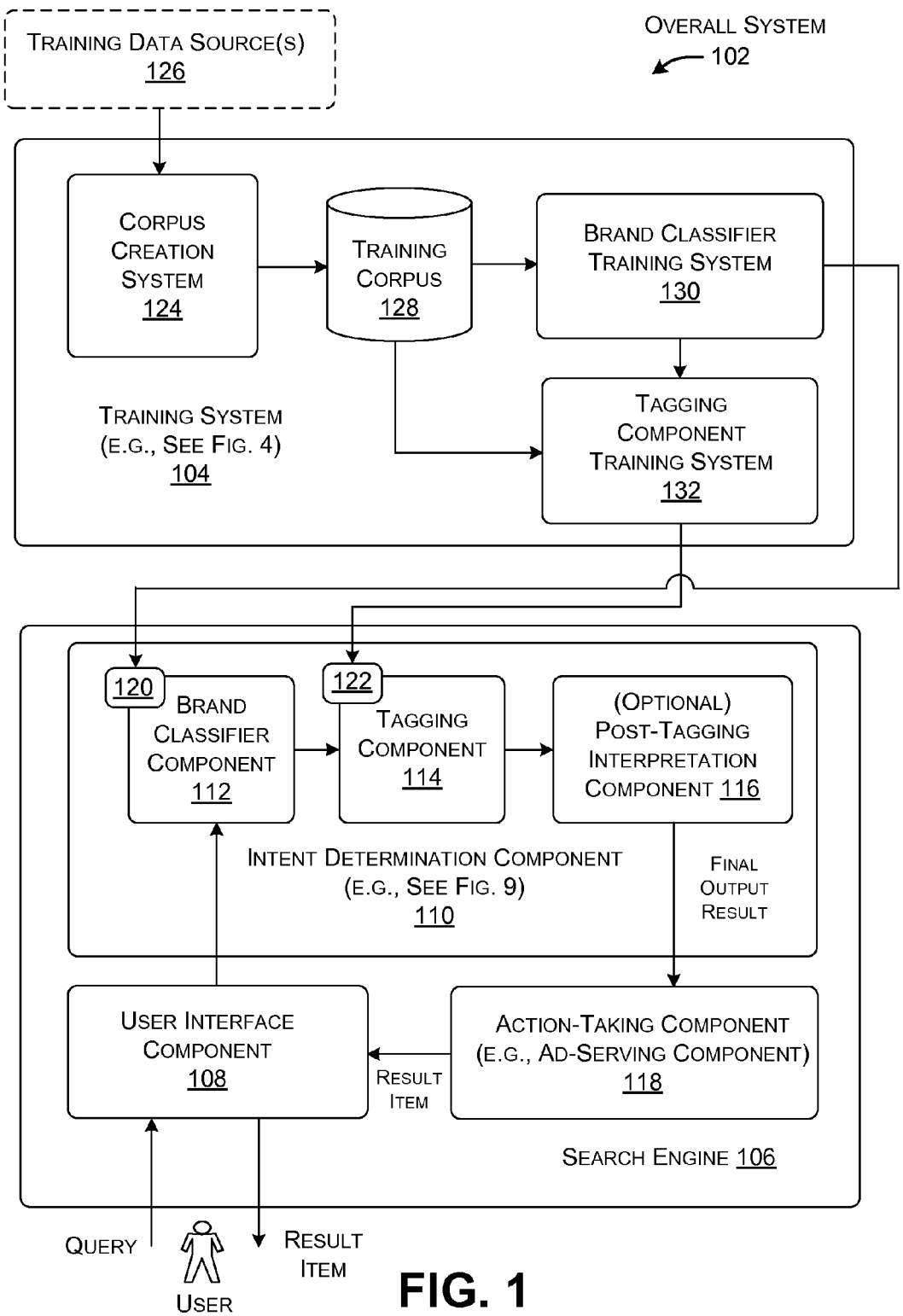
FIG. 1 shows an overview of a system that includes a training system and a search engine. The training system produces at least one brand classifier model and at least one tagging model, and the search engine applies these models.

FIG. 1 shows an overview of an overall system 102 that includes a training system 104 and a search engine 106. The training system 104 produces at least one brand classifier model and at least one tagging model, and the search engine 106 applies these models in the course of processing a user's query. However, as will be set forth in the context of Subsection A.4 below, FIG. 1 represents only one implementation of the multi-stage processing architecture described herein.

Referring to the search engine 106 first, the search engine 106 includes a user interface component 108 for receiving a query from a user. For example, the user interface component 108 may correspond to interface functionality that allows the user to interact with the search engine 106 via a client-side browser or the like, provided by a client computing device (not shown). For instance, a user may interact with the user interface component 108 to submit a query to the search engine 106 and to receive a response, generated by the search engine 106, to that query. In the more general case described below with reference to FIG. 10, the system 102 may operate on any type linguistic item (that is, not necessarily a query).

A query may be conceptualized as including one or more candidate items. An individual candidate item corresponds to any unit on which analysis is performed by the search engine 106. For instance, a candidate item may correspond to a word or other type of distinct token in the query, a portion of a word, a phrase that is composed of two or more words and/or other tokens, and so on.

An intent determination component 110 analyzes the intent of the query. The intent of the query generally refers to the objective(s) of the user in submitting the query. For example, the intent of a user who submits the query, "Where to buy Samsung Galaxy S5 white LTE" is to determine where he or she might purchase a particular type of smartphone. The intent determination component 110 determines the user's intent by annotating some or all of the candidate items in the user's query with semantically meaningful tags. Collectively, the tags reflect the user's intent.

More specifically, the intent determination component 110 assigns tags to a user's query using a multi-stage process. In a first stage, a brand classifier component 112 determines whether any candidate item in the user's query corresponds to a brand. A brand refers to a type of product produced by a particular organization or other entity (e.g., a company of any type), and which is associated with a brand name. For example, in the above query, the term "Samsung" likely corresponds to a brand. Note that the question of whether a particular candidate item under consideration is a brand may depend on the context in which that candidate item is used in a query; it is possible that the same word may correspond to a brand in one query, but not another. (The same is true with respect to other semantic categories, such as sub-brand.)

The brand classifier component 112 generates a classifier output result based on its analysis. The classifier output result reflects whether each candidate item in the query corresponds to a brand. More specifically, the brand classifier component 112 can generate a score for each candidate item in the query. The score reflects the probability that the candidate item corresponds to a brand. The intent determination component 110 can identify scores that exceed an environment-specific threshold as likely corresponding to brands.

A tagging component 114 generates tags for some or all of the candidate items in the query. The tagging component 114 performs this task, in part, based on the classifier output result. In other words, the tagging component 114 treats the classifier output result as evidence that the query contains a brand. However, the evidence is not conclusive or binding. For instance, in some cases, the tagging component 114 may ultimately conclude that a candidate item in the query that was identified as a brand is not, in fact, a brand.

More specifically, in one implementation, the tagging component 114 applies tags to the candidate items in query that are selected from a set of possible semantically meaning categories that pertain to products. One such tag identifies a corresponding candidate item as a brand. For example, the tagging component 114 can apply the brand tag to the candidate item "Samsung" in the above-described query.

Other tags pertain to other characteristics of the product that the user is attempting to describe in his or her query (if, in fact, the user is attempting to describe a product). For instance, a sub-brand tag is used to annotate a candidate item describes a sub-brand of a particular brand (such as the word "Galaxy" in the above example, where "Galaxy" may be considered as a sub-brand of "Samsung"). A model tag is used to identify a candidate item that describes a model (such as "S5" in the above example). A product tag is used to identify a candidate item that refers to a general product type (such as the word "smartphone," which might have been specified in the above query, but is not). An attribute tag is used to annotate a candidate item that refers to a characteristic of the product that is being described in the query (such as the words "white" and "LTE" in the above example). Alternatively, or in addition, the tagging component 114 can apply particular attribute tags associated with specific characteristics, such as by applying a color tag to identify a candidate item that refers to a color, a size tag to identify a candidate item that refers to a size, etc.

Other tags are used to represent other aspects of the user's intent, which do not describe characteristics of the product per se. For example, a "buy" tag is used to identify a candidate item which evinces the user's intent to purchase the product. A research intent tag is used to identify a candidate item that reflects the user's intent to perform research on the product. A merchant tag is used to annotate a candidate item that appears to refer to a merchant. A location tag is used to annotate a candidate item that makes reference to a location. A question tag is used to annotate a candidate item which appears to indicate that the user is asking a question. An "other" tag is used to label a candidate item that refers to some other category, not represented by any of the tags set forth above.

The above set of illustrative tags is set forth in the spirit of illustration, not limitation. Other implementations can include different sets of tags, including sets which omit one or more of the tags described above, and/or sets which provide additional types of tags. In any event, the tagging component 114 produces a tagging output result which constitutes a set of tags.

More specifically, as will be clarified in subsections to follow, the intent determination component 110 performs its analysis with respect to a plurality of domains. For example, the domains may refer to general product categories, such as an electronics domain, an apparel-related domain, a food-related domain, a restaurant-related domain, and so on. Different application environments may use different domains.

The intent determination component 110 performs analysis with respect to each domain by using a domain-specific classifier subcomponent to determine whether the query specifies a brand that is relevant to that domain. The intent determination component 110 then uses a domain-specific tagging component to annotate the candidate items in the query with tags, based on analysis that is specifically tailored to that domain. In one case, the intent determination component 110 applies the same set of possible tags across different domains, although this need not be the case for all implementations.

Figure 9:
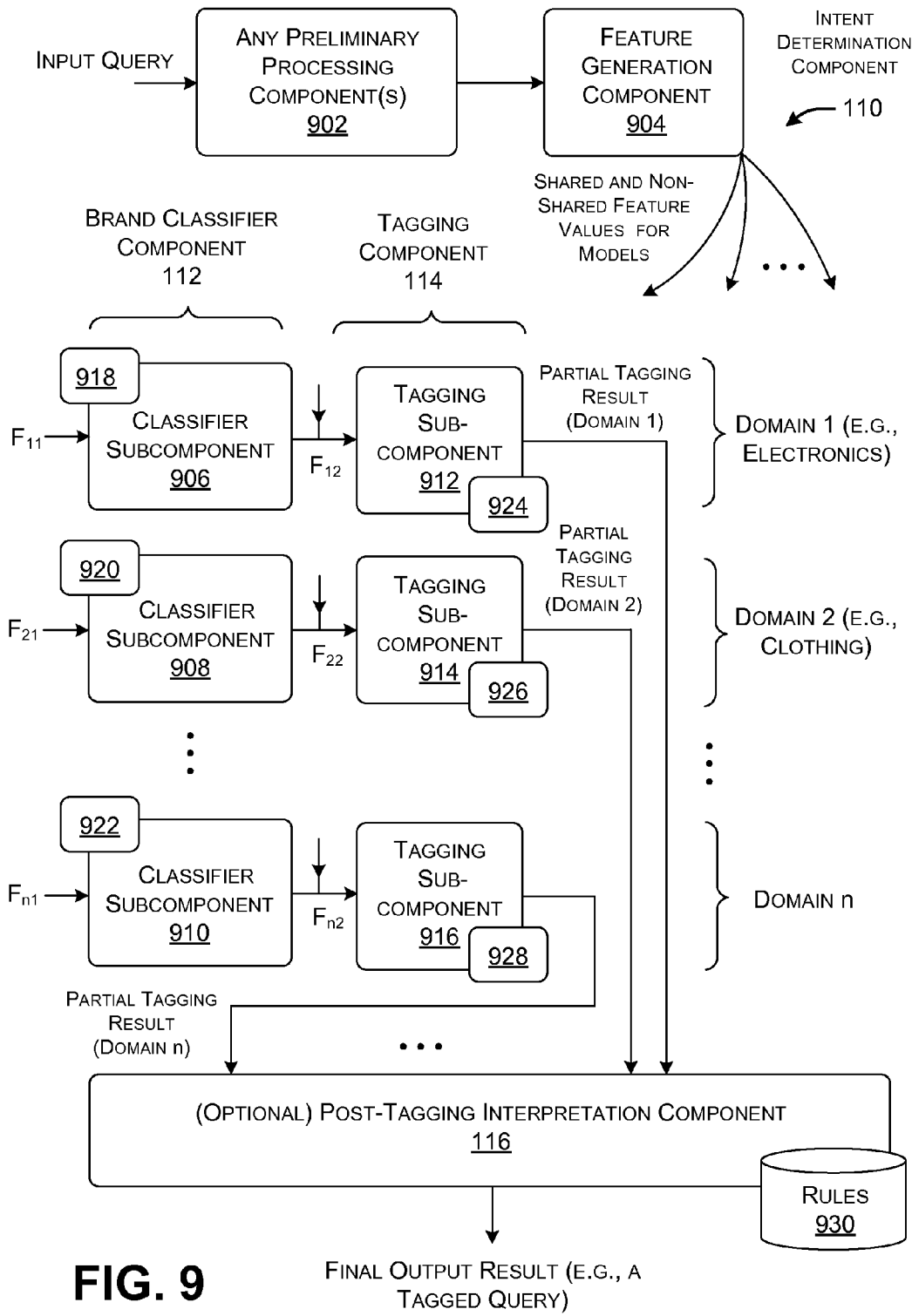
FIG. 9 shows one implementation of an intent determination component, which is a component of the search engine of FIG. 1.

Hence, the brand classifier component 112 may actually include a plurality of domain classifier subcomponents (not shown in FIG. 1, but shown in FIG. 9), and the tagging component 114 may include a plurality of domain tagging subcomponents (not shown in FIG. 1, but shown in FIG. 9). Each particular pairing of a particular domain classifier subcomponent and a particular tagging subcomponent performs its analysis with respect to a particular domain. In the terminology used herein, the particular domain classifier subcomponent produces a partial classifier result, while the particular domain tagging subcomponent produces a partial tagging result. Collectively, then, the tagging component 114 produces a tagging output result that includes a plurality of partial tagging results, one for each domain under consideration.

An optional post-tagging interpretation component 116 may perform additional analysis on the tagging output result, to produce a final output result. For example, the post-tagging interpretation component 116 may select the partial tagging result having the highest probably of accurately describing the query. For example, the post-tagging interpretation component 116 may determine that the query most likely corresponds to an electronics domain, rather than an apparel-related domain. Accordingly, the post-tagging interpretation component 116 will produce a final result which reflects the tags that were generated by the appropriate tagging subcomponent, associated with the electronics domain. As will be described below, the post-tagging interpretation component 116 can perform the above-described task by applying a machine-learned model, and/or by applying rules associated with a rules-based engine. In any case, note that the final output result contains a set of tags that reflect the intent of the user in performing the search.

An action-taking component 118 generates a result item based on the final output result provided by the intent determination component 110. The action-taking component 118 performs this task by mapping the tags specified in the final output result to an appropriate result item. The user interface component 108 may then provide the result item to the user, e.g., via an electronic message that is sent to the user's client computing device. For instance, the user interface component 108 may present the result item as visual information provided via a graphical user interface presentation, and/or audio information, and/or any other method of conveying information to the user.

In one case, for example, the action-taking component 118 may identify a digital product page in an electronic catalog of product pages. The product page may pertain to a product that matches whatever product that the user appears to be targeting in his or her query. In another case, the action-taking component 118 may identify a digital advertisement. The digital advertisement item may correspond to the product which the user appears to be targeting in his or her query, or a related product or service. For instance, in some cases, the action-taking component 118 may generate a digital advertisement to leverage an upselling or cross-selling opportunity, etc. In another case, the action-taking component 118 may generate a search result page that is based, in part, on the final output result. The search result page may provide a compilation of search result items (e.g., "search hits").

The action-taking component 118 can perform its function in different ways. For example, consider the application of the action-taking component 118 to the generation of digital product pages or digital advertisements. Each result item (e.g., a product page or an advertisement) may be associated with a set of one or more keywords. The action-taking component 118 can find at least one result item that is appropriate for a given final output result by finding a result item having keywords that match some or all of the tags associated with the final output result.

In another case, assume that the action-taking component 118 corresponds to search functionality providing by the search engine 106. Further assume that the search functionality uses some type of model-based engine to assess the relevance of search result items, with respect to the user's query. The search functionality can be adapted to use the tags associated with the final output result as additional evidence (e.g., as additional feature values) for use in determining the relevance of search result items.

Now referring to the training system 104, the training system 104 produces models that the intent determination component 110 uses to analyze the intent of the query. For example, the training system 104 may produce one or more brand classifier models, collectively depicted in FIG. 1 as model(s) 120, and one or more tagging models, collectively depicted in FIG. 1 as model(s) 122. That is, each brand classifier model provides logic that configures the analysis provided by a particular domain classifier subcomponent. Each tagging model provides logic that configures the analysis provided by a particular tagging subcomponent. In one implementation, a model may correspond to a set of weighting parameter values that are learned in the course of a machine-learning process (described below).

More specifically, the training system 104 may include a corpus creation system 124 for producing a corpus of training examples that are used by the training system 104 to produce the above-described models, using machine-learning techniques. Each training example may correspond to a linguistic item (such as a query). Each training example may also include an interpretation, which may be conveyed by one or more labels. For example, with respect to a query that is used for the purpose of creating a brand classifier model, an interpretation may indicate whether or not the query contains a brand. With respect to a query that is used for the purpose of creating a tagging model, an interpretation may specify tags associated with candidate items (e.g., words) in the query.

The corpus creation system 124 may compile the training examples based on information obtained from any data source(s) 126. The corpus creation system 124 may store the corpus of training examples that it produces in a data store 128. The next subsection (A.2) provides additional information regarding these functions.

A brand classifier training system 130 produces the brand classifier model(s) 120, while a tagging component training system 132 produces the tagging model(s) 122. Each of the brand classifier training system 130 and the tagging component training system 132 generate their models using a machine-training technique, based on the training examples. For example, the brand classifier training system 130 may correspond to a technique to producing a logistic regression model, while the tagging component training system 132 may correspond to a technique for producing a conditional random field (CRF) model. But other implementations can generate other types of models. For example, other implementations of the brand classifier training system 130 can produce a neural network model, a decision tree classifier model, a Bayesian network model, and so on. Other implementations of the tagging component training system 132 can produce a hidden Markov model (HMM), a maximum entropy Markov model (MEMM), and so on.

From a high-level perspective, each machine-learning process entails generating a collection of feature values for each training example in the corpus of training examples. The machine-learning technique then generates a set of weighting parameter values by iteratively operating on the feature values, to achieve a stated learning objective. For brevity, the subsequent explanation sometimes refers to the generation of feature values as the generation of features; it will be clear from the context in which "feature" is used whether reference is being made to a general variable (e.g., a particular feature variable) or a value for that variable (e.g., a particular feature value).

Figure 2:
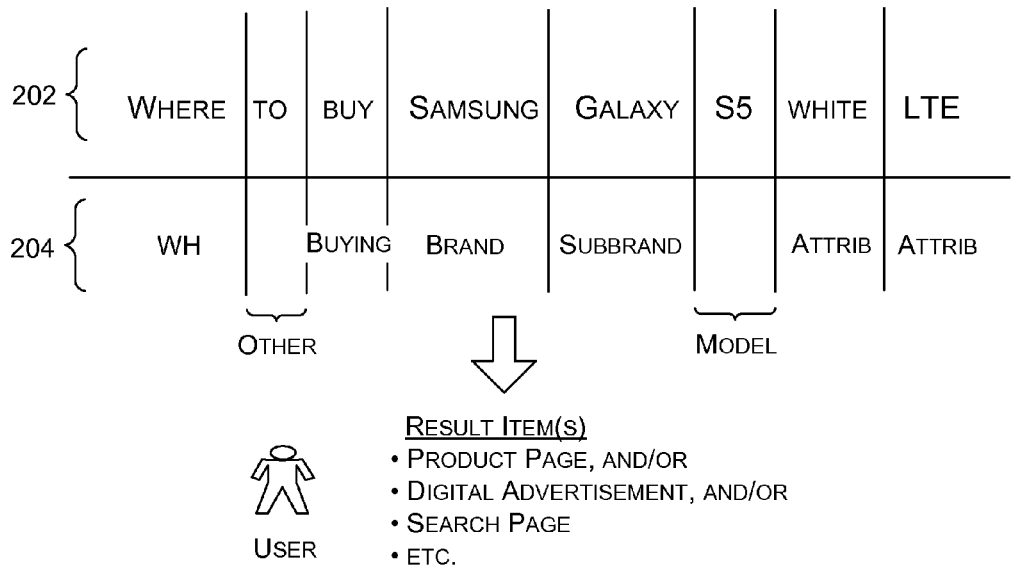
FIGS. 2 and 3 show two respective examples of tagged queries that may be produced by the search engine of FIG. 1.
Figure 3:
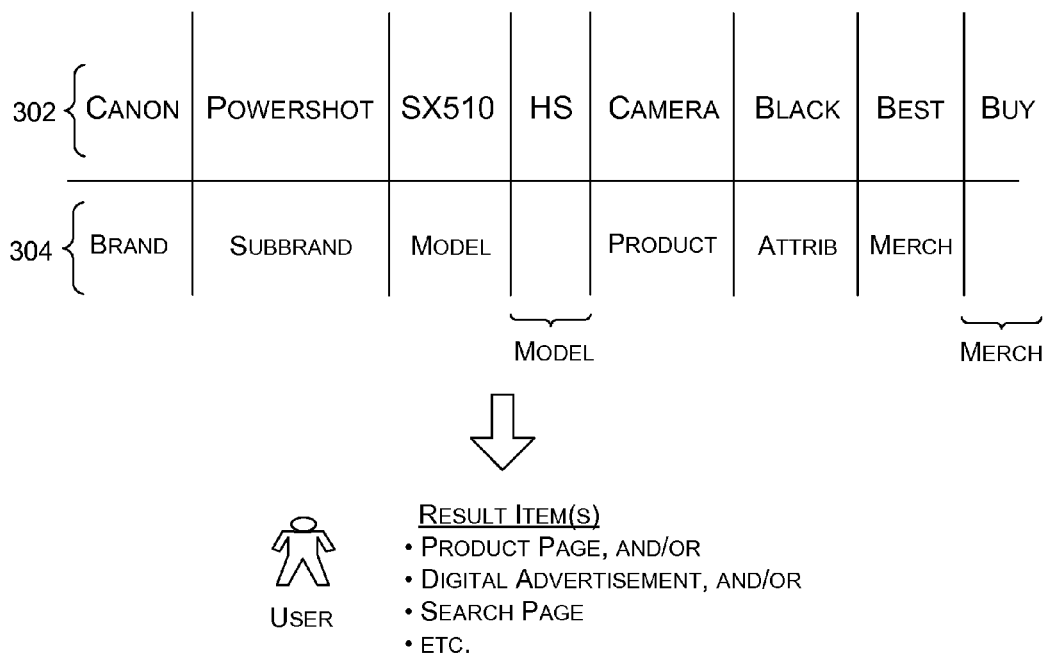

FIGS. 2 and 3 show two respective examples of tagged queries that may be produced by the search engine 106 of FIG. 1. That is, FIG. 2 corresponds to the query 202 introduced above, "Where to buy Samsung Galaxy S5 white LTE." The intent determination component 110 generates a set of tags 204 for the individual candidate items (in this example, corresponding to individual words) in the query 202. In FIG. 3, the user has submitted the query 302, "Canon Powershot SX510 HS camera black Best Buy." The intent determination component 110 generates a set of tags 304 for the individual candidate items in the query 302. The action-taking component 118 may serve any result item based on these tagging results, such as a product page, a digital advertisement, a compilation of search result items, and so on.

Figure 4:
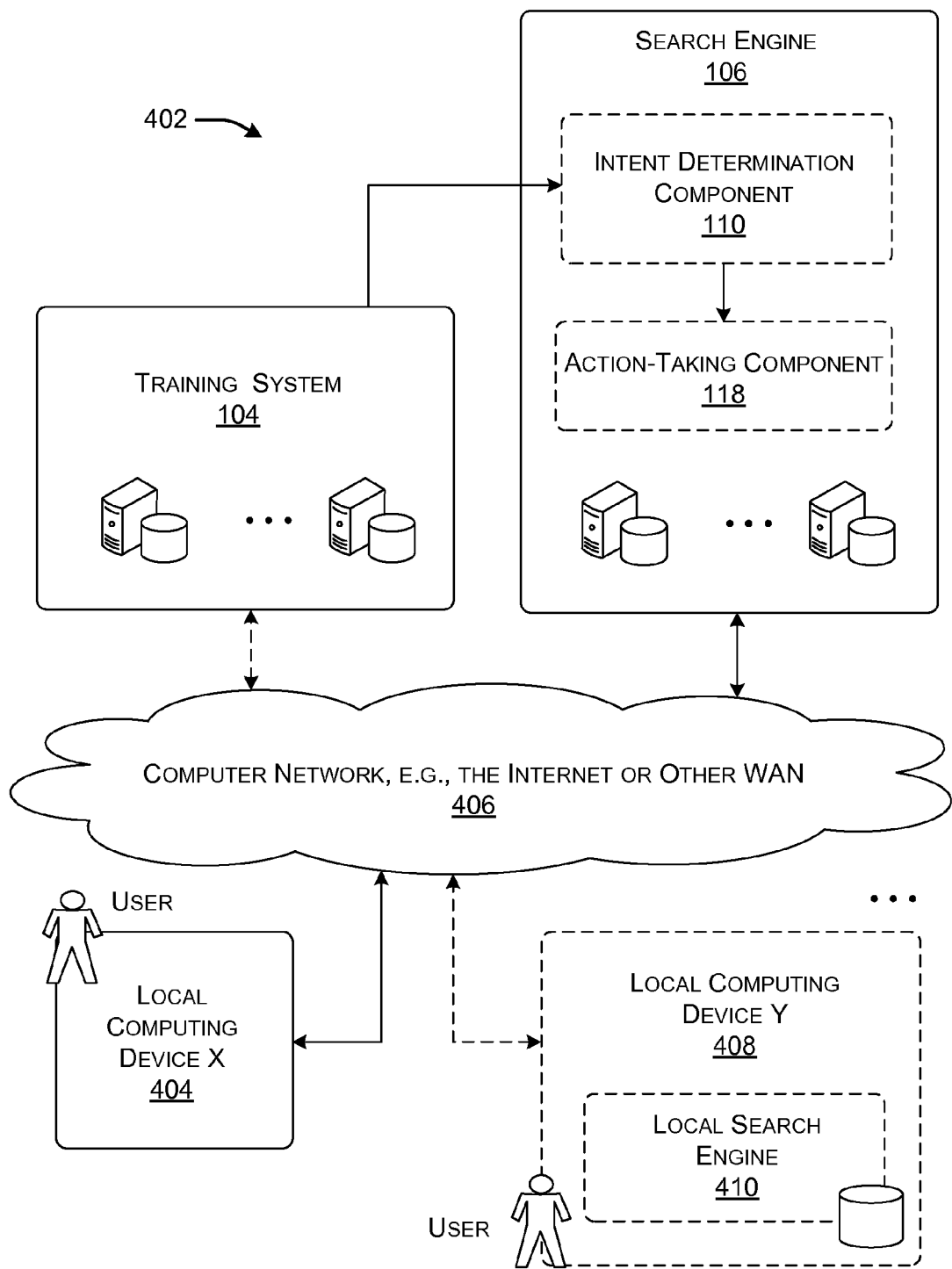
FIG. 4 shows computing equipment that may be used to implement the system of FIG. 1.

FIG. 4 shows illustrative computing equipment 402 that may be used to implement the system 102 of FIG. 1. As shown there, the computing equipment 402 may implement the training system 104 as one or more server computing devices, data stores, etc. Similarly, the computing equipment 402 may implement the search engine 106 as one or more server computing devices, data stores, etc. For example, the search engine 106 may correspond to an online search service that uses the intent determination component 110 in the process of responding to users' search queries.

The functionality of the system 102 (of FIG. 1) need not be grouped in the manner illustrated in FIG. 4. To cite one example, FIG. 4 indicates that a single collection of computing devices may implement both the intent determination component 110 and the action-taking component 118. But in another case, a first collection of computing devices may implement the intent determination component 110, while a second collection of computing devices may implement the action-taking component 118. For example, the action-taking component 118 may correspond to an ad-serving system that is functionally coupled to the intent determination component 110, but is otherwise separate from the intent determination component 110 (and possibly administered by a different entity than an entity that administers the intent determination component 110). Similarly, the different components of the training system 104 can be allocated to two or more separate, but functionally coupled, systems.

An end user ("user") may interact with the search engine 106 using a local computing device 404, via a computer network 406. The local computing device 404 may correspond to a stationary personal computing device (e.g., a workstation computing device), a laptop computing device, a set-top box device, a game console device, a tablet-type computing device, a smartphone, a wearable computing device, and so on. The computer network 406 may correspond to a local area network, a wide area network (e.g., the Internet), one or more point-to-point links, and so on, or any combination thereof.

Alternatively, or in addition, another local computing device 408 may host a local search engine 410. That local search engine 410 can implement the same functions as the remote search engine 106, e.g., by providing a local intent determination component, a local action-taking component, etc. For example, the local search engine 410 may correspond to a local document retrieval application that uses a local intent determination component to interpret the intent of the user's query. In that context, an end user can interact with the local search engine 410 in an offline manner.

In yet other implementations, any aspect of the training system 104 and/or the search engine 106 of FIG. 1 can be distributed between local client computing resources and remote resources.

A.2. The Training System

Figure 5:
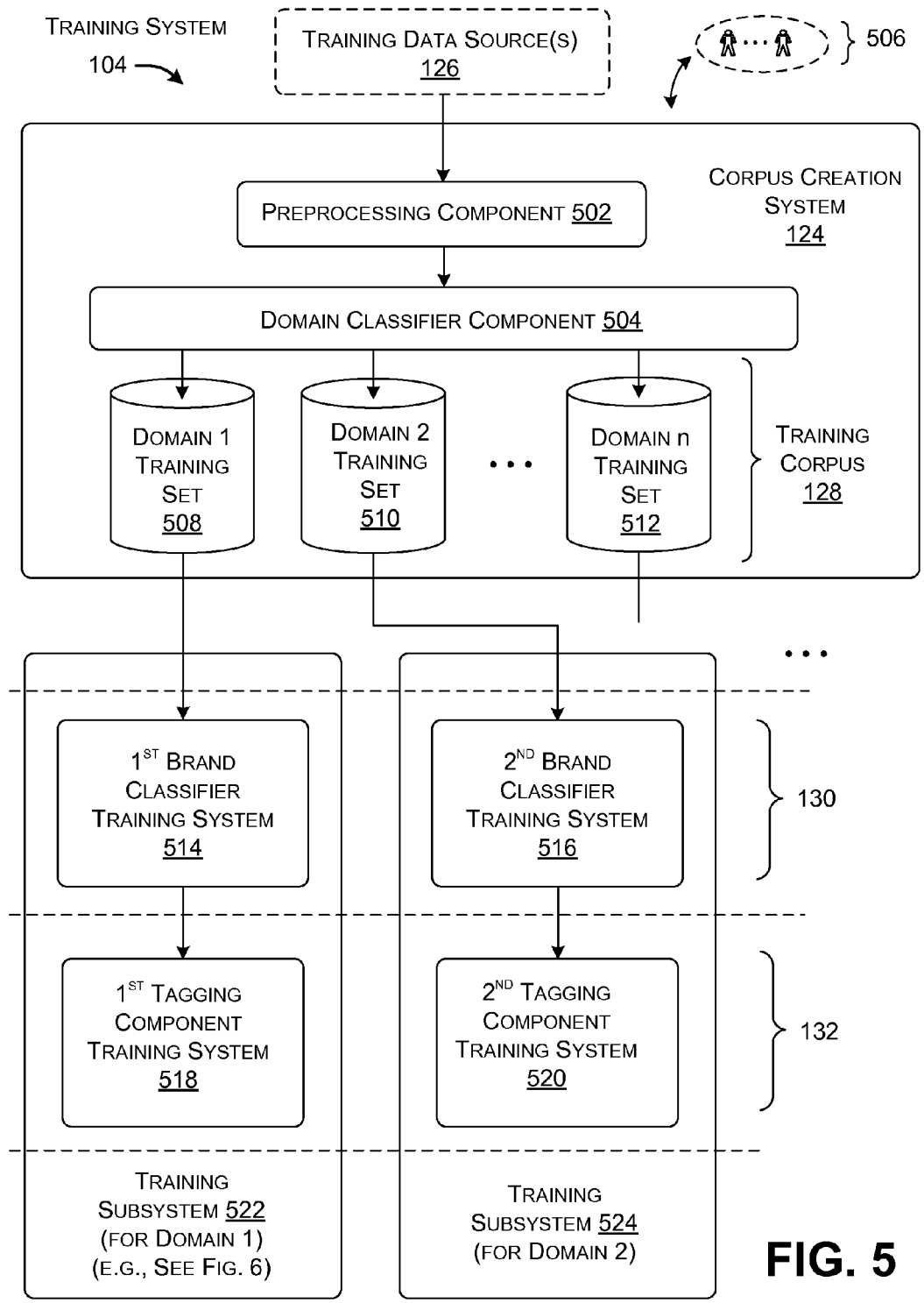
FIG. 5 shows one implementation of the training system of FIG. 1.

FIG. 5 shows one implementation of the training system 104 of FIG. 1. From a high-level perspective, the training system 104 includes the corpus creation system 124 that generates a training corpus of training examples, for storage in a data store 128, together with a brand classifier training system 130 and a tagging component training system 132.

As described in Subsection A.1, the corpus creation system 124 may produce the training examples from linguistic items which it receives from one or more training sources 126. For example, the corpus creation system 124 can mine queries from a query log of a search engine. Alternatively, or in addition, the corpus creation system 124 can mine queries and/or other linguistic items from an online shopping service. Alternatively, or in addition, the corpus creation system 124 can collect queries that have been submitted to an online voice recognition system, such as the CORTANA system provided by MICROSOFT Corporation of Redmond, Wash. These examples are illustrative, rather than limiting; the corpus creation system 124 can obtain linguistic items for use in producing training examples from additional sources.

A preprocessing component 502 can perform any type of preliminary processing on the collected queries. For example, the preprocessing component 502 can perform spell-checking on the queries. The preprocessing component 502 can then automatically correct misspelled query terms, if possible. If correction is not possible or desired, the preprocessing component 502 can discard queries with identified misspellings.

A domain classifier component 504 next determines a domain associated with each query based on all of the candidate items (e.g., words) that appears in the query. The domain corresponds to the general field to which the query, as a whole, likely pertains. For example, the set of possible domains may include electronics, apparel-related, restaurants, etc. In one case, the domain classifier component 504 may perform its operation by mapping the candidate items (e.g., words) that appear in a query to a domain that is most closely associated with those candidate items. In some cases, the domain classifier component 504 may perform this function using a keyword matching operation. In other cases, the domain classifier component 504 may perform this function using a conventional machine-trained or rules-based classifier component, such as hierarchical category classification component. If a query pertains to two or more domains, the domain classifier component 504 may optionally produce an output result which reflects this conclusion.

Next, the corpus creation system 124 associates training labels with the queries, to produce the training examples. The corpus creation system 124 can perform this task with respect to queries associated with each respective domain.

For example, first consider the production of training examples in an electronics-related domain, for eventual use in producing a brand classifier model for that domain. The goal here is to produce a first subset of positive training examples and a second subset negative training examples. A positive example corresponds to a query that specifies at least one brand, such as "Samsung." A negative example corresponds to a query that does not specify any brands.

In one implementation, the corpus creation system 124 can determine whether each query is a positive example by comparing its candidate items (e.g., its words, phrases, etc.) with the brands specified in a brand dictionary. (That is, in one example, the brand dictionary is specific with respect to the particular domain under consideration, such as electronics.) If a query contains one of these brands, then it is labeled as a positive training example.

In one implementation, the corpus creation system 124 can rely on the human judgment of one or more evaluators 506 to manually identify whether a query is a negative example. Alternatively, or in addition, the corpus creation system 124 can conclude that the query is a negative example depending on the nature of the search results that have been returned based on this query. The search results, in turn, may be obtained from a query log maintained by a search engine. For example, the corpus creation system 124 can determine that the query does not contain a brand if the top n search result items that were returned on the basis of the query contained less than a prescribed number of search result items that pertain to electronics-related products.

Next consider the production of training examples in an electronics-related domain, for eventual use in producing a tagging model for this domain. In one approach, the corpus creation system 124 can rely on the human evaluators 506 to apply tags to the candidate items in a set of queries, based on their independent judgments.

As a result of the above preliminary processing, the corpus creation system 124 produces a plurality of sets of training examples, provided in respective data stores (508, 510, . . . , 512). Each set of training examples corresponds to a particular domain and is used to train a brand classifier model and a tagging model for that particular domain. Collectively, the sets of training examples correspond to the above-identified corpus of training examples, collectively provided in the data store 128.

As to the training operation itself, the training system 104 may rely on a separate brand classifier training system to produce the brand classifier model for each domain, and a separate tagging component training system to produce the tagging model for each domain. More specifically, the overall brand classifier training system 130 of FIG. 1 may include a first brand classifier training system 514 for a first domain, a second brand classifier training system 516 for the second domain, and so on. The overall tagging component training system 132 of FIG. 1 may include a first tagging component training system 518 for the first domain, a second tagging component training system 520 for the second domain, and so on.

An individual pairing of a particular brand classifier training system with a particular tagging component training system, for a particular domain, corresponds to a domain-specific training subsystem. For example, FIG. 5 shows a first training subsystem 522 that is associated with the first domain, a second training subsystem 524 that is associated with the second domain, and so on. In each training subsystem, the tagging component training system relies on the results generated by its brand classifier training system.

In another example, the training is performed with respect to a single domain. In that case, the training system 104 will include a single set of training examples, a single brand classifier training system for producing a single brand classifier model, and a second tagging component training system for producing a single a single tagging model.

Figure 6:
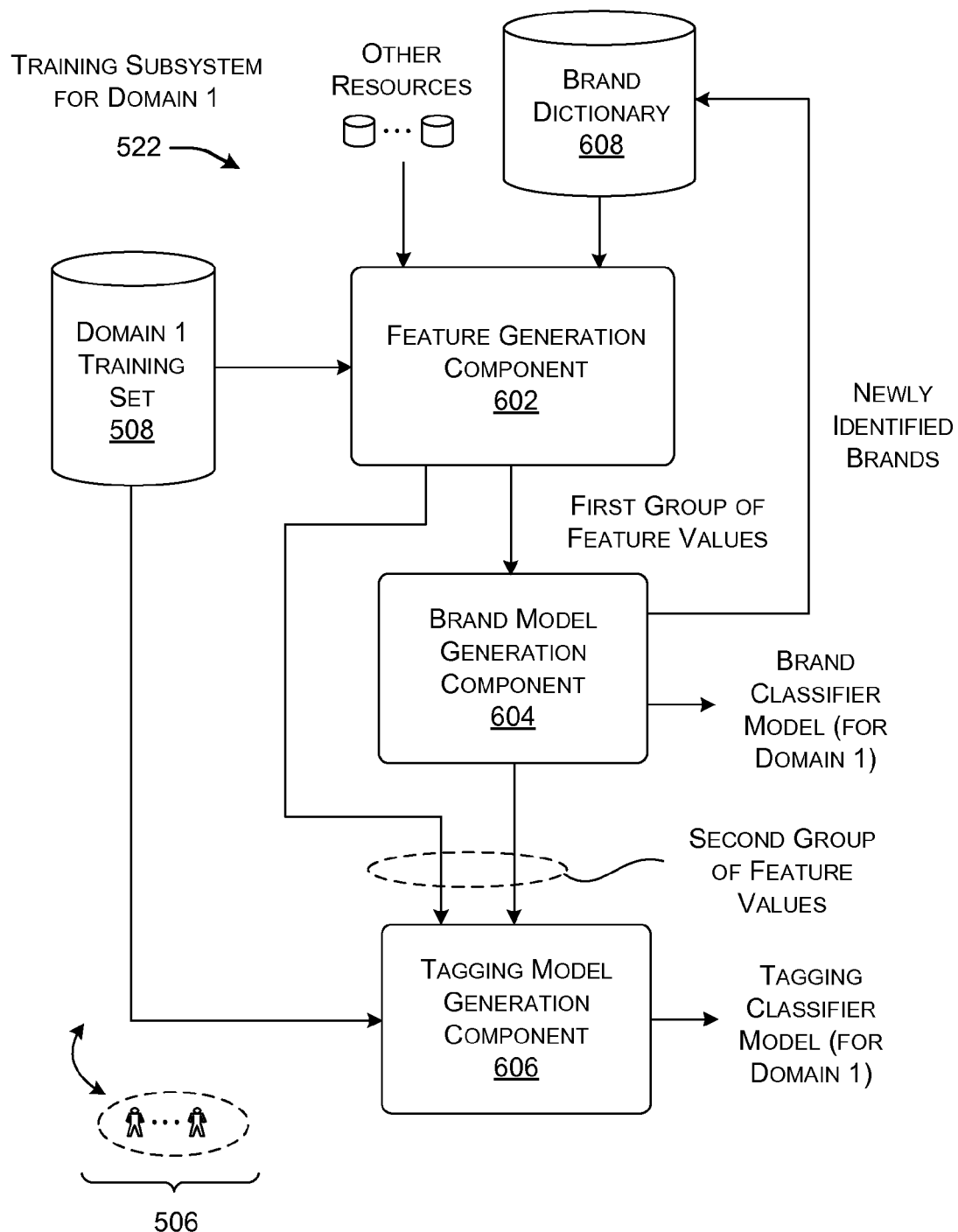
FIG. 6 shows a part of the training system of FIG. 5, which produces a brand classifier subcomponent and a tagging subcomponent for a particular domain.

Advancing to FIG. 6, this figure describes an illustrative implementation of the first training subsystem 522 of FIG. 5, associated with a first domain (e.g., an electronics-related domain). As explained above, the first training subsystem 522 includes the first brand classifier training system 514 for producing a brand classifier model for the first domain, and a first tagging component training system 518 for producing a tagging model for the first domain. Other training subsystems may have a similar construction to that shown in FIG. 6, although not shown.

The training subsystem 522 includes a feature generation component 602, a brand model generation component 604 for generating the brand classifier model for the first domain, and a tagging model generation component 606 for generating a tagging model for the first domain. The first brand classifier training system 514 (of FIG. 5) may be regarded as a combination of the feature generation component 602 and the brand model generation component 604. The first tagging component training system 518 (of FIG. 5) may be regarded as a combination of the feature generation component 602 and the tagging model generation component 606.

The feature generation component 602 generates a first group of feature values for use by the brand model generation component 604 and a second group of features for use by the tagging model generation component 606. (More exactly, as will be described below, the second group of feature values also includes some feature values that are generated by the brand model generation component 604, e.g., corresponding to brand scores generated by the brand model generation component 604.) A subset of common feature values corresponds to features that appear in both the first and second groups of feature values. Another subset of feature values refers to feature values that appear in only the first group of feature values (and not the second group of feature values). Another subset of feature values refers to feature values that appear in only the second group of feature values (and not the first group of feature values).

To reduce latency in the training operation, the feature generation component 602 can generate the common feature values once, rather than repeating the generation of these common feature values for both the brand model generation component 604 and the tagging model generation component 606. More generally, some of the feature values generated by the feature generation component 602 may also be shared across domains, e.g., for use in training the brand models and/or tagging models for those other domains. The training system 104 as a whole can reduce the latency in the training operation by computing any feature value that is used in training two or more models only once, rather than repeating these computations across different domains.

A feature generally refers to some characteristic of a query under consideration; its value corresponds to a value associated with that characteristic. More specifically, the feature generation component 602 can compute a feature value for each candidate item in a query under consideration. To repeat, a candidate item may correspond to an individual token (e.g., a word) in a query, a phrase that includes two or more words, a part of a token, etc.

The following explanation sets forth an illustrative first group of features (and associated feature values) for use by the brand model generation component 604, and a second group of features (and associated feature values) for use by the tagging model generation component 606. This specific listing is to be understood as presented in the spirit of illustration, not limitation. Other implementations can include additional features and/or can omit any of the features described below.

The first group of features may include a set of orthographic features, such as features which describe candidate position, candidate length, unigram identity, capitalization pattern, fine-grained digit-letter combination pattern, other symbol pattern, prefix/suffix pattern, etc. The candidate position refers to the position of the candidate item (e.g., word) that is being considered, within the query. The candidate length refers to the number of characters in the candidate item. The unigram identity corresponds to a reference identifier associated with the candidate item, e.g., corresponding to a pre-assigned ID associated with the candidate item, as specified in a dictionary. The capitalization pattern refers to the pattern of uppercase and lowercase characters in the candidate item (e.g., indicating whether the candidate item begins with an uppercase character, or contains an uppercase character within its body, etc.).

The fine-grained digit-letter combination pattern specifies the manner in which a candidate item combines numeral characters with letter characters (if, in fact, the candidate item contains such a combination). Or the fine-grained digital-letter combination pattern may specify the manner in which a current candidate item, which contains a numeral character, relates to a neighboring candidate item. For example, the candidate item "SX510" in FIG. 3 matches one type of digit-letter combination pattern. The candidate item "6" in a query that contains the phrase "iPhone 6" specifies another type of digit-letter combination pattern.

The symbol pattern specifies other symbolic patterns associated with the candidate item. The prefix/suffix pattern specifies a pattern associated with the prefix and/or suffix in the candidate item (if, in fact, the candidate item contains a prefix or a suffix).

The first group of features may also include one or more syntactical features. For example, the first group of features may include one or more features that describe a part-of-speech of a candidate item under consideration. In one implementation, the feature generation component 602 can identify the part-of-speech of the candidate item by performing a lookup operation in a general purpose part-of-speech dictionary, and/or by using a machine-trained model to analyze the candidate item. In one example, such a machine-trained model may be specifically trained based on queries, rather than, or in addition to, general linguistic items.

The first group of features may also include a subset of lexicon features, indicating whether the candidate item under consideration is found in one or more specified dictionaries. More specifically, different feature values may be generated which indicate, respectively, whether the candidate item is found in a stop word dictionary (containing words that are typically ignored when processing a query, such as "and" and "the"), a common word dictionary (containing common words used across different domains), a brand dictionary (specifying known brand names in the domain under consideration), a size dictionary (containing words commonly used to refer to the size of a product in the domain under consideration), a product type dictionary (containing words that are commonly used to refer to types of products in the domain under consideration), a color dictionary (containing words that describe different colors), a location dictionary (containing words that are commonly used to refer to different locations), and so on.

The first group of features may also include a subset of contextual features. A contextual feature refers to the context in which the candidate item under consideration appears within a query. For example, some contextual features may specify the identity(ies) of one or more words that precede the candidate item in the query. Other contextual items may specify the identity(ies) of one or more words that follow the candidate item in the query. Other contextual features may describe characteristics of the words which precede and/or follow the candidate item, such as by specifying a word's capitalization pattern, digit-letter combination pattern, etc. Other contextual features may identify whether a nearby word or phrase appears to be referring to a research-related intent (e.g., as when the query specifies "find," or "what is," etc.). Other contextual features may identify whether a nearby word or phrase appears to refer to a purchase-related intent (e.g., as when the query specifies the words "buy" or "purchase" or "sale," etc.). Other contextual features may identity whether previous and/or following words are non-keywords (e.g., indicating whether the previous and/or following words omit stop-words, pure numbers, locations, etc.).

The first group of features may also include one or more features generated by a search engine for the candidate item under consideration (such as the candidate item's TF-IDF score). Another search engine feature may describe the number of commerce-related result items, returned by a search engine for the candidate item, within the top n search result items. The first group of features may also include different types of language model scores for the candidate item under consideration.

Now referring to the second group of features (for use by the tagging model generation component 606 in producing the tagging model), these features may include any of the following features for a candidate item under consideration: one or more unigram identity features, one or more bigram features (or, more generally, n-gram features), one or more fine-grained letter-digit combination pattern features, one or more word length features, one or more capitalization pattern features, one or more prefix/suffix pattern features, one or more part-of-speech features, one or more brand dictionary features, one or more product dictionary features, one or more color dictionary features, one or more location dictionary features, one or more stop word dictionary features, one or more common word dictionary features, one or more size dictionary (and/or size pattern) features, one or more sub-brand dictionary features, one or more TF-IDF score features, one or more other search engine-generated features, one or more language model features, and so on.

Most of the above features are common to the first group of features, and were hence described above. An n-gram feature (e.g., a bigram feature) specifies a pre-assigned reference code associated with the identified n-gram. A sub-brand dictionary feature describes whether a candidate item under consideration is present in a sub-brand dictionary. These features are not present in the first group of features (although they could be alternatively used in the first group of features, in another implementation). The second group of features can also include various transitional features. For example, a transitional feature describes the probability of occurrence of the present candidate item, given one or more previous candidate items.

Generally, the feature generation component 602 can generate feature values for the above-described features by drawing on a collection of resources. The resources may include various language models, search engines, dictionaries, etc. On particular dictionary is a brand dictionary provided in a data store 608, described in additional detail below.

The brand model generation component 604 may use a logistic regression machine-learning technique, e.g., with L2 regularization, to generate a logistic regression-type brand classifier model for the first domain. The brand classifier model may be expressed as a set of weighting parameter values. The brand model generation component 604 performs its task based on the first group feature values described above, together with the labels (which identify whether each training example in the training set includes a brand). For each iteration of the training process, the brand model generation component 604 uses the brand classifier model, in its current state of development, to provide a score for each training example; the score provides the model's assessment of whether the training example does, in fact, contain a brand.

The tagging model generation component 604 may use the conditional random field (CFR) technique to generate a CFR-type tagging model for the first domain. The tagging model may be expressed as a set of weighting parameter values. The tagging model generation component 606 performs its task based on the second group of feature values described above, together with the labels. More specifically, some of the features in the second group of feature values may include feature values generated by the feature generation component 602, a subset of which may be common to the first group of feature values. But other feature values in the second group of feature values may correspond to the scores generated by the brand model generation component 604. The tagging model generating component 606 also operates based on the tagging labels which are associated with the training examples, and which may be manually specified by the human evaluators 506.

The training subsystem 522 for the first domain also includes functionality for bootstrapping the brand dictionary provided in the data store 608. For example, initially, the brand dictionary may obtain a list of brands that are obtained by "crawling" an electronic product catalog, and extracting brand names from that catalog. There is high confidence that those entries represent actual brands. During training, in the manner described above, the brand model generation component 604 generates a brand model and applies that brand model to the training examples. That is, for each such training example, the brand model generation component 604 provides an assessment of whether the training example is likely to contain a brand.

In some cases, the brand model generation component 604 identifies a candidate item in the query which matches a brand name that is already contained in the brand dictionary. But in other cases, the brand model generation component 604 may identify a token that has high confidence of representing a brand name (based on its score), but is not yet in the brand dictionary. That is, recall that the brand model indicates whether a query contains a brand by considering several pieces of evidence, not just an indication of whether the query contains a word that matches an entry in the brand dictionary; this means that the outcome of the brand model may not always correspond to whether or not the query contains words that exist in the brand dictionary.

If the query contains a new brand (that is not currently specified in the brand dictionary), the training subsystem 522 adds this brand name to the brand dictionary. In some cases, one or more of the human evaluators 506 may be called on to confirm the conclusion that that the new brand name should be added to the brand dictionary. The training subsystem 522 can repeat the above operation for all of the training examples in the training set, to produce an updated brand dictionary.

The brand model generation component 604 may then regenerate the brand model based on the updated brand dictionary. Overall, the training subsystem 522 can repeat the above-described procedure any number of times. In this iterative process, the training subsystem 522 may increase the number of brands in the brand dictionary, as well as improve the quality of the brand model that is eventually produced. The process also allows the training subsystem 522 to dynamically adapt to the introduction of new brands to the marketplace. In contrast, brand classifiers that use static dictionary resources cannot dynamically adjust to the introduction of new brands in the manner described above.

As another illustrative aspect, the training subsystem 522 may optionally also "hide" a subset of the entries in the brand dictionary upon each iterative generation of the brand model. An entry that is "hidden" is treated by the feature generation component 602 as effectively absent from the brand dictionary. For example, the brand dictionary may contain the brand name "Samsung." If this entry is marked as hidden, the feature generation component 602 will treat this entry as if it is not contained in the brand dictionary.

The training subsystem 522 performs the above-described omission process to help produce a model that is robust to the introduction of new brands. For example, assume that "Samsung" is hidden from the brand dictionary, yet one or more of the training examples contain this brand name. The brand model generation component 604 produces a brand model that is configured to nevertheless classify "Samsung" as a brand name, which the training subsystem 522 knows, a priori, is a brand name.

In one implementation, the training subsystem 522 varies the subset of entries in the brand dictionary which it considers as hidden across the iterative generation of the brand model. In another implementation, the training subsystem 522 may treat the same group of brands as hidden across the iterations. In any case, the training subsystem 522 may be said to dynamically grow the brand dictionary in the manner described above, while simultaneously ignoring a subset of the entries in that dictionary.

Figure 7:
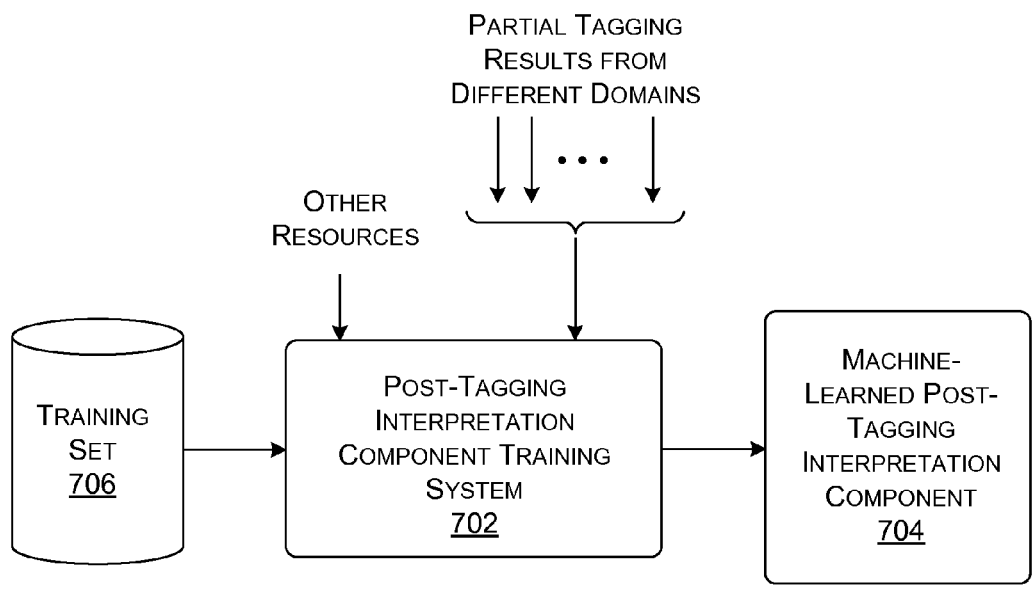
FIGS. 7 and 8 show two implementations of training functionality for producing a post-tagging interpretation component, for use in the system of FIG. 1.
Figure 8:
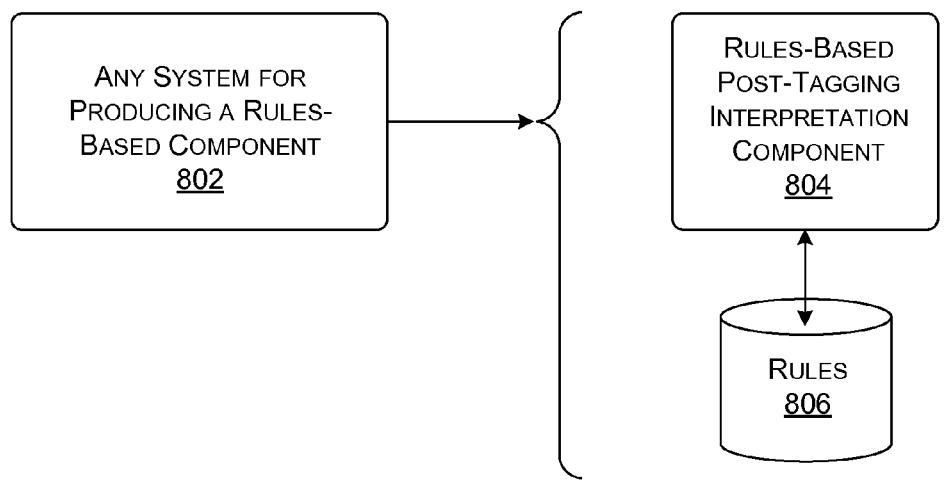

FIGS. 7 and 8 shows two implementations of training functionality for producing the post-tagging interpretation component 116, for use in the system of FIG. 1. More specifically, in the case of FIG. 7, a training system 702 uses a machine-learning technique to produce a machine-learned post-tagging interpretation model, which can then be used to implement a post-tagging interpretation component 704. The training system 702 may perform the above-described operation using any machine-learning technique, and based on a set of training examples provided in a data store 706. The training system 702 may also receive feature values which describe the training examples. Some of the feature values may correspond to the scores generated by the various brand subcomponents and tagging subcomponents described above.

The resultant machine-learned post-tagging interpretation component 704 can determine the most likely domain associated with a query under consideration, and hence, can be used to choose the tags that have been generated by the tagging subcomponent associated with that domain.

In the case of FIG. 8, a system 802 produces a rules-based post-tagging interpretation component 804. The rules-based post-tagging component 804 may operate based on a set of rules specified in a data store 806. For example, at least some of the rules may be structured in an IF-THEN format; each such rule specifies that a particular interpretation is appropriate given a specified set of contextual factors. For instance, one such rule may have the effect of choosing among a set of domains having relatively high scores, given a certain set of circumstances. Another such rule may have the effect of ignoring a domain under a certain set of circumstances. An administrator of a particular environment may choose the set of rules based on empirical observation of appropriate outcomes in different fact situations.

In another implementation, the post-tagging interpretation component 116 shown in FIG. 1 can use a combination of functionality shown in FIGS. 7 and 8. In other words, the post-tagging interpretation component 116 can make use of both a machine-trained statistical model and a rules-based framework.

A.3. The Intent Determination Component

FIG. 9 shows one implementation of an intent determination component 110. Recall that the intent determination component 110 is the component of the search engine 106 (of FIG. 1) that determines the intent of the user, based on the query submitted by the user, and based on the use of the brand classifier component 112 and the tagging component 114. This subsection provides further information regarding one implementation of the intent determination component 110.

In a first stage, the intent determination component 110 uses a preliminary processing component 902 to perform preprocessing on the received query. For example, the preliminary processing component 902 can perform spell-checking on the query and can automatically correct any misspellings, if possible and if desired.

A feature generation component 904 generates a plurality of feature values associated with the query. Each feature value describes come characteristic of the query. More specifically, the feature generation component 904 can generate the same types of feature values described above for the training-phase feature generation component 602.

A first subset of the feature values, generated by the feature generation component 902, pertains to feature values that the brand classifier component 112 uses to perform its task, while a second subset of these feature values pertains to feature values that the tagging component 114 uses to perform its task. A collection of shared feature values is common to both the first subset of feature values and the second subset of feature values. To reduce latency, the feature generation component 904 generates these common feature values only once.

As also described above, the brand classifier component 112 may actually include a plurality of brand classifier subcomponents (906, 908, . . . , 910), while the tagging component 114 may include a plurality of tagging subcomponents (912, 914, . . . , 916). The classifier subcomponents (906, 908, . . . , 910) operate on the basis of respective brand classifier models (918, 920, . . . , 922) generated by the training system 104, while the tagging subcomponents (912, 914, . . . , 916) operate on the basis of respective tagging models (924, 926, . . . , 928) generated by the training system 104.

Each pairing of a particular classifier subcomponent and a particular tagging subcomponent performs brand analysis and tagging analysis, respectively, with respect to a particular domain. FIG. 9 shows that each subcomponent performs its operation, on a candidate-item-by-candidate-item basis, based on a subset of feature values (F). For instance, for domain 1, the classifier subcomponent 906 receives a feature subset $F_{11}$ to generate a partial classifier result, and the tagging subcomponent 912 receives a feature subset $F_{12}$ to generate a partial tagging result.

There is a set of feature values that is common to both the subset $F_{11}$ and the subset $F_{12}$. As stated above, the feature generation component 904 only calculates these common feature values once. The same is true with respect to other domains. Further, some of the feature values in the subsets $F_{11}$ and the subset $F_{12}$ may be used in other domains. Once again, the feature generation component 904 generates these shared feature values once, rather than a plurality of times. Finally, note that the feature subset $F_{12}$ that feeds into the tagging subcomponent 912 includes some feature values that originate from the output of the classifier subcomponent 906 and some feature values which originate from the feature generation component 904. This indicates that the tagging subcomponent 912 receives the brand scores generated by the classifier subcomponent 906 as part of its feature subset $F_{12}$.

The post-tagging interpretation component 116 receives the partial tagging results generated across the different domains by the various tagging subcomponents (912, 914, . . . , 916). The post-tagging interpretation component 116 disambiguates the query by choosing from among the possible partial tagging results, to generate a final output result. The final output result reflects a subset of tags identified by one of the tagging subcomponents (912, 914, . . . , 916) for the domain that is assessed to be the most appropriate. For example, the post-tagging interpretation component 116 can determine that a query pertains to electronics rather than apparel, etc. To perform this task, the post-tagging interpretation component 116 can rely on a machine-learned statistical model, a rules-based framework (which relies, in turn, on a data store 930 of rules), or a combination thereof. Although not shown, the post-tagging interpretation component 116 can also generate its conclusion based on other evidence, such as any of the feature values generated by the feature generation component 904, the partial classifier results provided by the brand classifier subcomponents (906, 908, . . . , 910), and so on.

A.4. Variations

Figure 10:
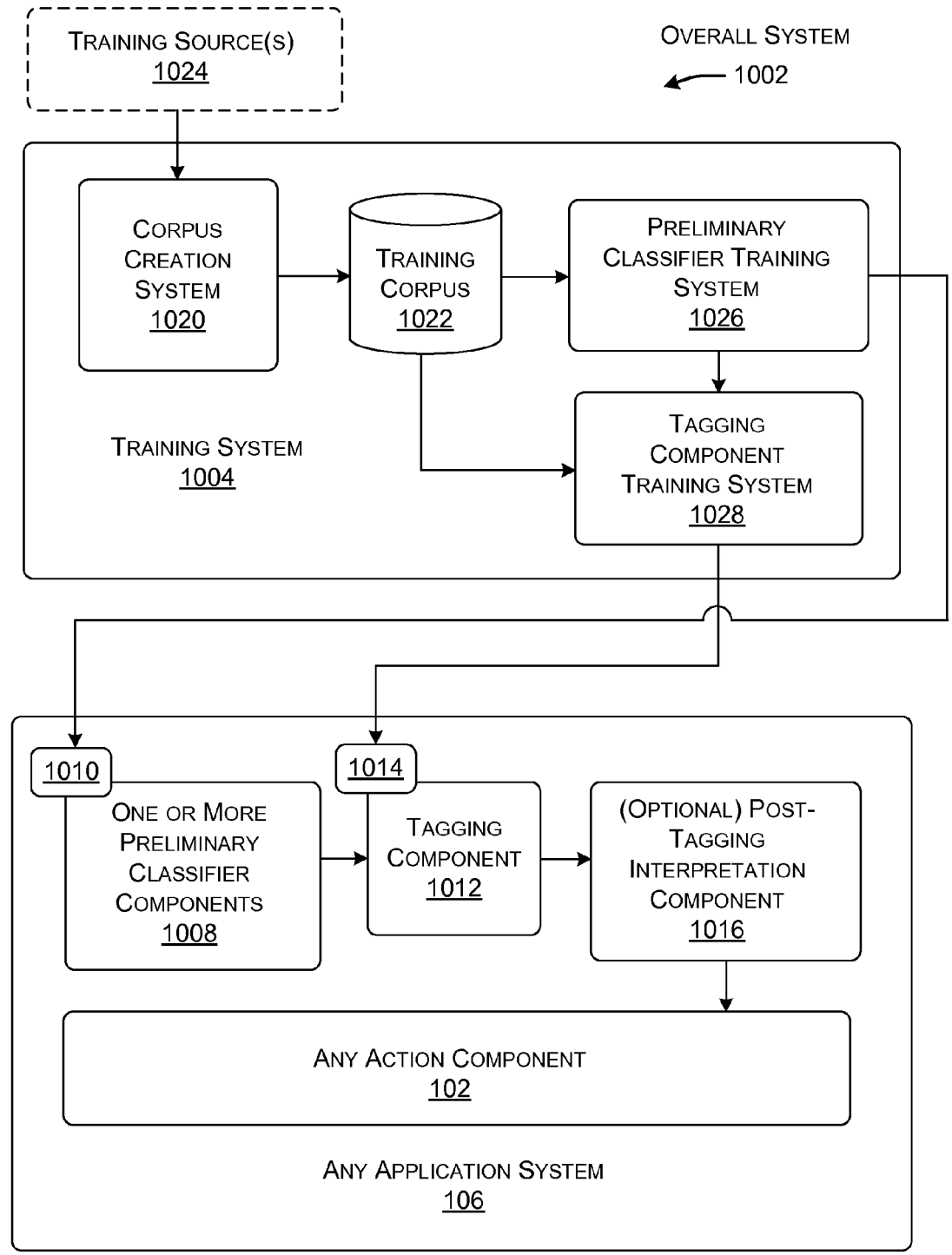
FIG. 10 shows another system for analyzing linguistic items using a multi-stage processing framework. The system of FIG. 10 is more general purpose compared to the system of FIG. 1.

FIG. 10 shows another overall system 1002 for analyzing linguistic items using a multi-stage processing approach. The system of FIG. 10 is more general-purpose in nature, compared to the system of FIG. 1.

More specifically, the system 1002 includes a training system 1004 and an application system 1006 which are the counterparts of the training system 104 of FIG. 1 and the search engine 106 of FIG. 1, respectively. Referring first to the application system 1006, that component operates on a linguistic item (not necessarily a query) using two or more stages. In a first stage, one or more preliminary classifier components 1008 apply one or more machine-trained models 1010 to determine whether the linguistic item contains a candidate item that matches a prescribed category of tags (but not necessarily brand-related category). The preliminary classifier component(s) 1008 generate a classifier output result.

A tagging component 1012 applies one or more tagging models 1014 to generate tags for the candidate items in the linguistic item using, in part, the classifier output result of the preliminary processing component(s) 1008. The tagging component 1012 generates a tagging output result.

As before, the preliminary classifier component(s) 1008 can actually include a plurality of domain-specific preliminary classifier subcomponents (not shown), and the tagging component 1012 can include a plurality of domain-specific tagging subcomponents. Hence, the tagging output result generated by the tagging component 1012 may actually include plural partial tagging results generated by the plural tagging subcomponents.

An optional post-tagging interpretation component 1016 chooses one of the partial tagging results associated with a respective domain, e.g., by disambiguating among the possible domains to which the linguistic item may pertain. An action-taking component performs any action on the basis of a final output result generated by the post-tagging interpretation component. The action may correspond to choosing a result item (e.g., a product page, a digital advertisement, a search result page, etc.) and sending that result item to the user.

The training system 1004 may generate the preliminary classifier model(s) 1010 and the tagging model(s) 1014 for use, respectively, by the preliminary classifier component(s) 1008 and the tagging component 1012. That is, a corpus creation system 1020 may generate a corpus of training examples for storage in a data store 1022, based on linguistic examples extracted from one or more training sources 1024. A preliminary classifier training system 1026 produces the preliminary classifier model(s) 1010 based on the training examples, while a tagging component training system 1028 generates the tagging model(s) 1014 based on the training examples. The preliminary classifier training system 1026 may apply any machine-learning technique, such as a logistic regression technique. Similarly, the tagging component training system 1028 can apply any machine-learning technique, such as a conditional random field (CRF) technique.

In other words, the system 1002 of FIG. 10 is similar to the system 102 of FIG. 1, but with the following generalizations. First, the application system 1006 of FIG. 10 can process any linguistic item (not necessarily a query) in any application environment (not necessarily a search engine). Second, the application system 1006 of FIG. 10 can perform a preliminary classification task with respect to any category of tags, not necessarily limited to the identification of brands in a query. For example, the system 1002 can perform a preliminary classification task to determine the presence of an entity name in a linguistic item. In other cases, the application system 1006 can perform a preliminary classification to determine two different categories of tags in a linguistic item. The application system 1006 can perform the analysis associated with these two categories in parallel and/or in series A.5. Conclusion: Illustrative Useful Effects In conclusion to Section A, the systems (102, 1002) of FIGS. 1 and 10 may produce various useful effects. First, the search engine 106 of FIG. 1 and the application system 1006 of FIG. 10 apply a latency-efficient technique for generating common feature values that are used by multiple models, thereby speeding up the processing performed by the search engine 106 and the application system 1006.

Second, the systems (102, 1002) can accurately analyze the meaning of an input linguistic item based on a relatively small amount of training data. For instance, in one situation, there may be more labeled training data for use in producing a brand classifier model compared to labeled training data for use in producing a full tagging model. To address this issue, the intent determination component 110 of FIG. 1 uses a preliminary brand classifier component 112 to determine the presence of a brand in the query. A separate downstream tagging component 114 can perform the task of generating tags for all of the words in the query based, in part, on evidence provided by the brand classifier component 112. This staged approach leverages the system's ability to make relatively strong predictions regarding brands for the ultimate purpose of tagging all of the words in a query. Combining the analysis into a single CFR phase or knowledge base matching phase may have the effect of diluting the relatively strong evidence that can be gleaned from the separate brand analysis, and thus may lead to a less accurate model.

Third, the systems (102, 1002), because they employ accurate models, may allow a user to more quickly identify the information and/or services that he is seeking, or which may otherwise interest the user. This effect, in turn, may help the systems (102, 1002) make efficient use of systems resources (e.g., memory, processing resources, etc.). This effect may also reduce network traffic between client computing devices and remote system resources (e.g., because the user may access useful information by submitting a reduced number of queries, compared to the case in which the systems (102, 1002) are not used).

Fourth, the systems (102, 1002) provide a way of dynamically reacting to the introduction of new brands, e.g., on the basis of the iterative bootstrapping procedure described with respect to FIG. 6. In that procedure, the systems (102, 1002) dynamically grow the dictionary entries in the brand dictionary, while simultaneously (optionally) "hiding" a subset of the entries in that dictionary on each iteration. A system that uses a static brand dictionary, by contrast, cannot accurately detect the presence of new brands without painstaking manual updating of reference resources. The same principle described in FIG. 6 may be leveraged to dynamically grow other dictionaries.

The above effects are cited by way of illustration, not limitation. The systems (102, 1002) set forth above may have additional useful effects.

B. Illustrative Processes

FIGS. 11-15 show processes that explain the operation of the systems (102, 1002) of Section A in flowchart form. Since the principles underlying the operation of the systems (102, 1002) have already been described in Section A, certain operations will be addressed in summary fashion in this section.

Figure 11:
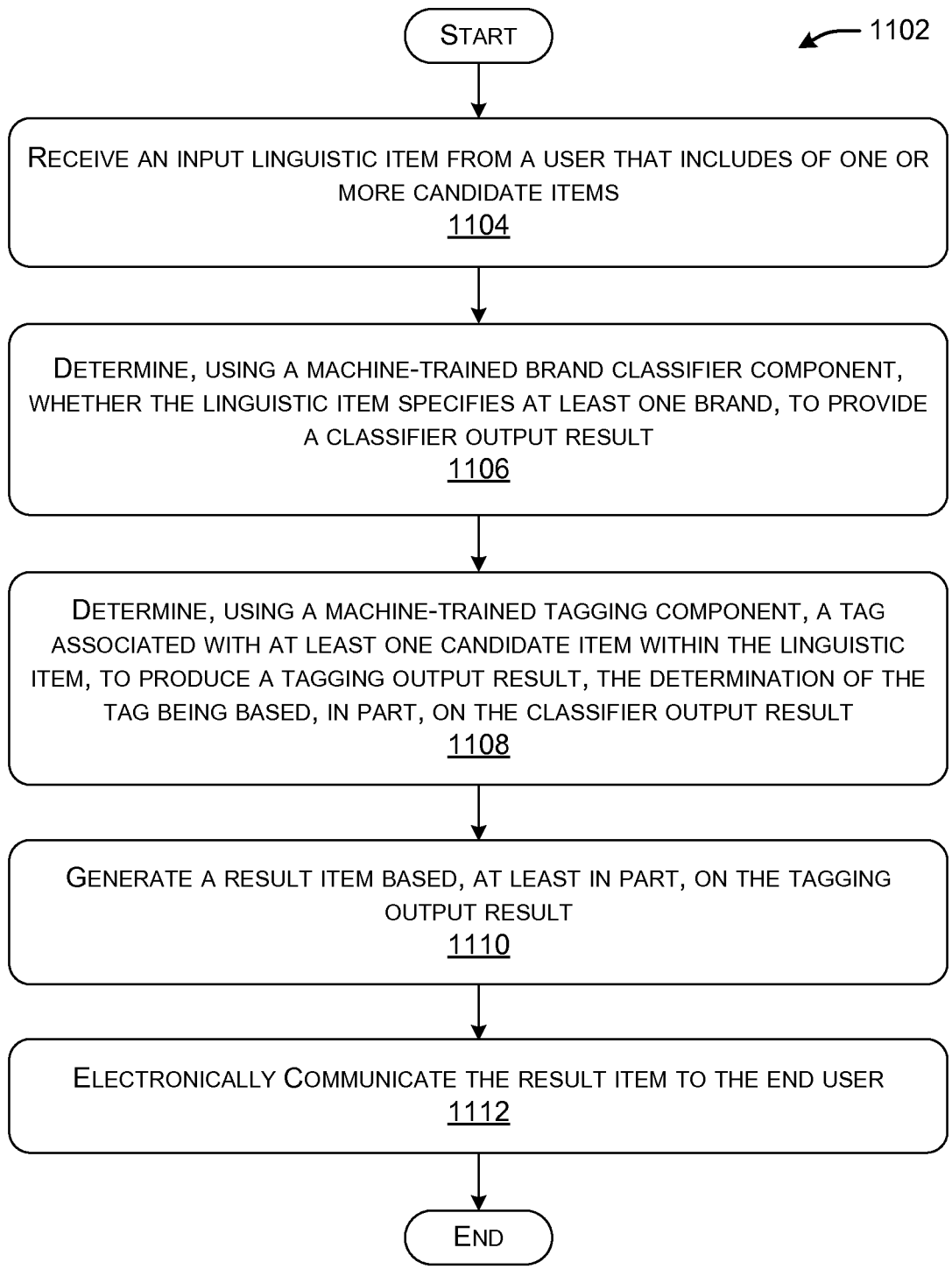
FIG. 11 shows a process that describes one manner of operation of the search engine of FIG. 1 (or the operation of an application system that is shown in FIG. 10).

Starting with FIG. 11, this figure shows a process 1102, implemented by one or more computing devices, for assigning tags to a linguistic item, and performing an action based on the tags. The process 1102 is described below with reference to the system 102 of FIG. 1, but the process 1102 also applies to processing performed by the system 1002 of FIG. 10. In block 1104, the search engine 106 receives an input linguistic item (e.g., a query) from a user that includes one or more candidate items (e.g., words). In block 1106, the search engine 106 uses a machine-trained brand classifier component 112 to determine whether the linguistic item specifies at least one brand, to provide a classifier output result. In block 1108, the search engine 106 uses a machine-trained tagging component 114 to determine a tag associated with at least one candidate item within the linguistic item, to produce a tagging output result; the determination of the tag is based, in part, on the classifier output result. In block 1110, the action-taking component 118 of the search engine 106 generates a result item (e.g., a product page, a digital advertisement, a search page, etc.) based, at least in part, on the tagging output result. In block 1112, the search engine 106 communicates the result item to the user.

Figure 12:
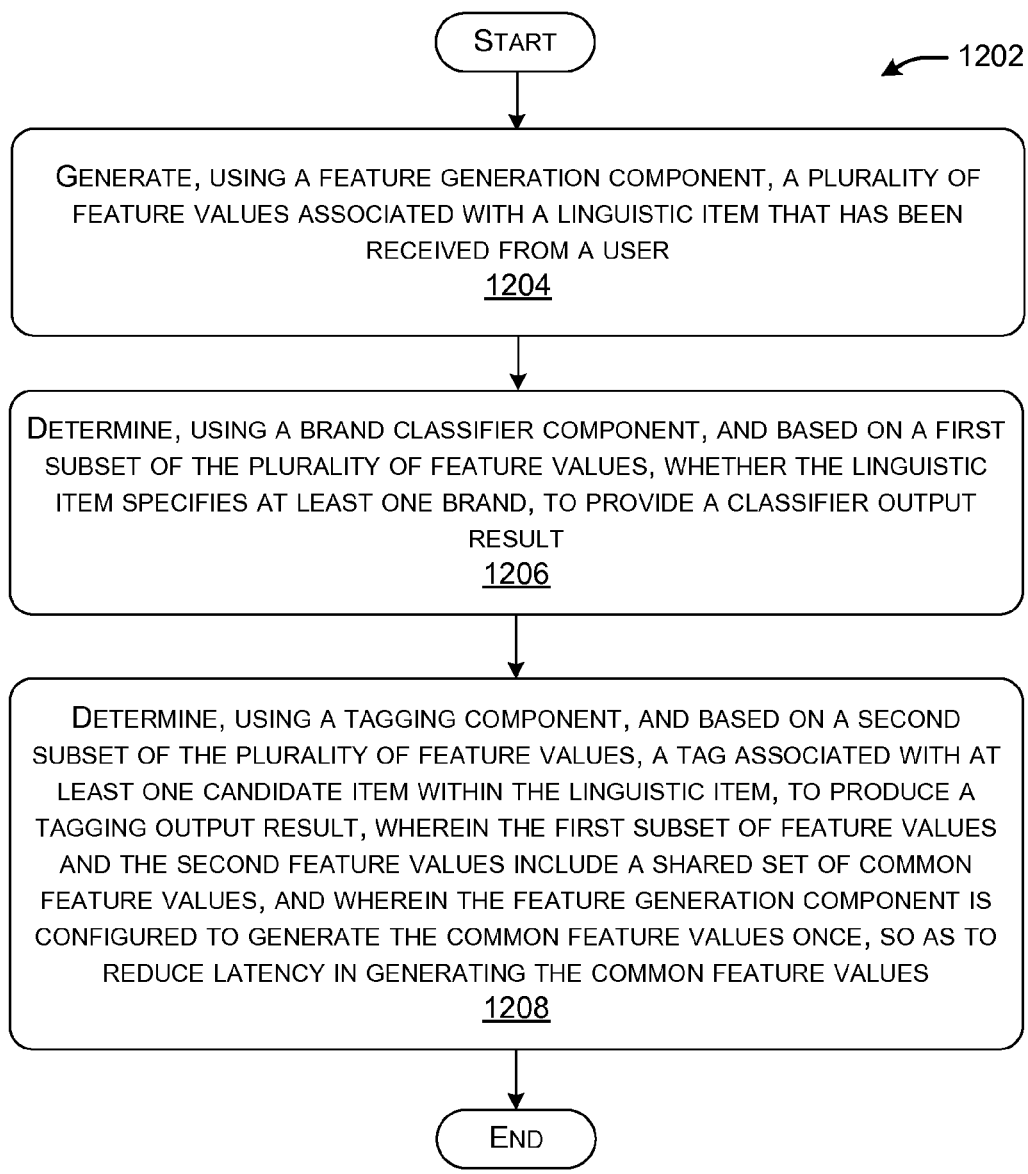
FIG. 12 shows a process that represents additional illustrative details regarding the operations of FIG. 11.

FIG. 12 shows a process 1202 that represents one implementation of the process 1102 of FIG. 11. Again, the process 1202 is described below with reference to the system 102 of FIG. 1, but the process 1202 also applies to processing performed by the system 1002 of FIG. 10. In block 1204, the search engine 106 generates, using the feature generation component 904 (of FIG. 9), a plurality of feature values associated with a linguistic item that has been received from a user. In block 1206, the search engine determines, using the brand classifier component 112, and based on a first subset of the plurality of feature values, whether the linguistic item specifies at least one brand, to provide a classifier output result. In block 1208, the search engine 106 determines, using the tagging component 114, and based on a second subset of the plurality of feature values, a tag associated with at least one candidate item within the linguistic item, to produce a tagging output result. Block 1208 further states that the first subset of feature values and the second subset of feature values include a shared set of common feature values. Block 1208 further states that the feature generation component 904 is configured to generate the common feature values once, so as to reduce latency in the generation of the common feature values).

Figure 13:
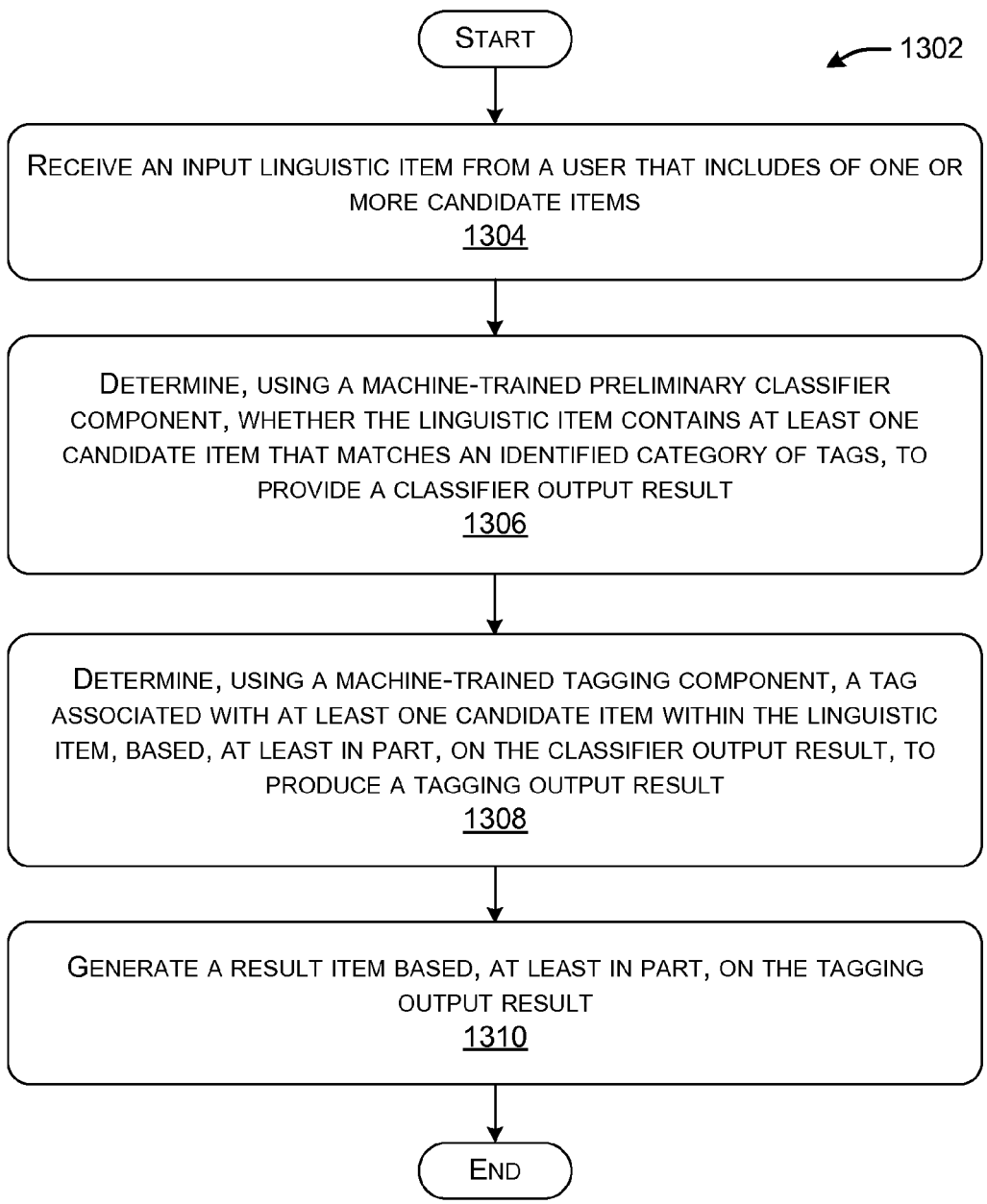
FIG. 13 shows a process that describes one manner of operation of the application system of FIG. 10.

FIG. 13 shows a process 1302 which represents the more general operation of the application system 1006 of FIG. 10. In block 1304, the application system 1006 receives an input linguistic item from a user that includes one or more candidate items. In block 1306, the application system 1006 determines, using a machine-trained preliminary classifier component 1008, whether the linguistic item contains at least one candidate item that matches an identified category of tags, to provide a classifier output result. In block 1308, the application system 1006 determines, using a machine-trained tagging component 1012, a tag associated with at least one candidate item within the linguistic item, based, at least in part, on the classifier output result, to produce a tagging output result. In block 1014, the action-taking component generates a result item based, at least in part, on the tagging output result.

Figure 14:
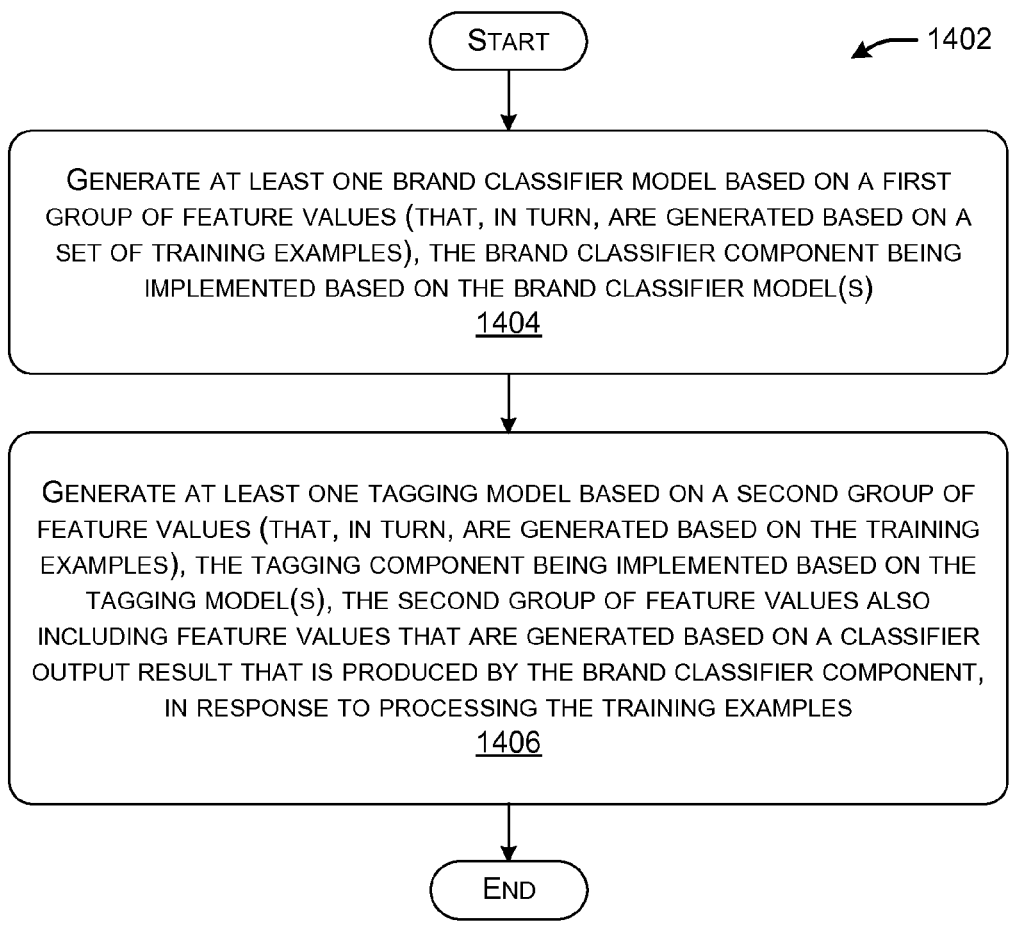
FIG. 14 shows a process that describes one manner of operation of the training systems of FIG. 1 or 10.

FIG. 14 shows a process 1402 for producing models using a machine-training process. The process 1402 is described below with reference to the training system 104 of FIG. 1, but the process 1402 also applies to the training process performed by the training system 1004 of FIG. 10. In block 1404, the training system 104 generates at least one brand classifier model 120 based on a first group of feature values that, in turn, are generated based on a set of training examples; the brand classifier component 112 is implemented based on the brand classifier model(s) 120. In block 1406, the training system 104 generates at least one tagging model 122 based on a second group of feature values that, in turn, are generated based on the training examples; the tagging component 114 is implemented based on the tagging model(s) 122. Further, block 1406 states that the second group of feature values includes feature values that are generated based on a classifier output result that is produced by the brand classifier component 112, in response to processing the training examples.

Figure 15:
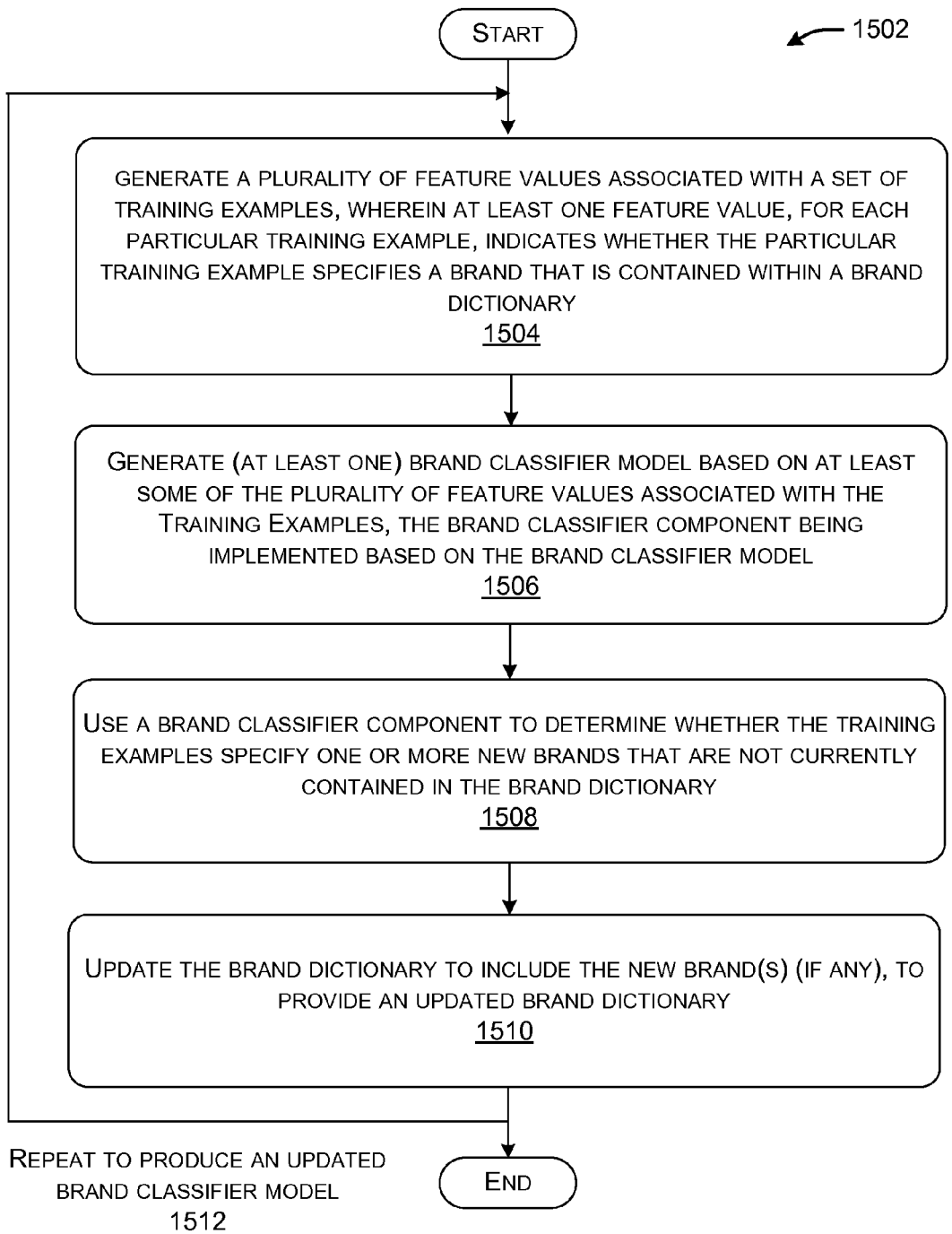
FIG. 15 shows a process that describes an iterative manner of dynamically expanding a brand dictionary, using the training systems of FIG. 1 or 10.

Finally, FIG. 15 shows a process 1502 for dynamically bootstrapping a brand dictionary in the course of generating at least one brand model. The process 1502 is described below with reference to the training system 104 of FIG. 1, but the process 1502 also applies to the training process performed by the training system 1004 of FIG. 10. In block 1504, the training system 104 generates (using the feature generation component 602 of FIG. 6) a plurality of feature values associated with a set of training examples. At least one feature value, for each particular training example, indicates whether the particular training example specifies a brand that is contained within a brand dictionary provided in a data store 608. In block 1506, the training system 104 generates (at least one) brand classifier model 120 based on at least some of the plurality of feature values; a brand classifier component 112 is implemented based on the brand classifier model(s) 120. In block 1508, the training system 104 uses the brand classifier component 112 to determine whether the training examples specify one or more brands that are not currently contained in the brand dictionary. In block 1510, the training system 104 updates the brand dictionary to include the new brands (if any), to provide an updated brand dictionary. The caption 1512 associated with the feedback loop in FIG. 15 indicates that the training system 104 may optionally repeat the operations one or more times, to iteratively produce an updated brand classifier model.

In conclusion, the following provides a non-exhaustive list of illustrative aspects of the principles set forth herein.

According to a first aspect, a method is described herein for assigning tags to a linguistic item, and performing an action based on the tags. The method includes (a) receiving an input linguistic item from a user that includes one or more candidate items; (b) determining, using a machine-trained brand classifier component, whether the linguistic item specifies at least one brand, to provide a classifier output result; (c) determining, using a machine-trained tagging component, a tag associated with at least one candidate item within the linguistic item, to produce a tagging output result, the above-referenced determining of the tag being based, in part, on the classifier output result; (d) generating a result item based, at least in part, on the tagging output result; and (e) electronically communicating the result item to the user. These operations are performed by one or more computing devices.

According to a second aspect, the input linguistic item is a query submitted by the user to a search engine, and the tagging output result reflects an intent of the user in submitting the query.

According to a third aspect, the result item is a product page, provided by the search engine, that pertains to a product that is selected based on the intent of the user.

According to a fourth aspect, the result item may alternatively, or in addition, correspond to a digital advertisement, provided by the search engine, that is selected based on the intent of the user.

According to a fifth aspect, the result item may alternatively, or in addition, correspond to a compilation of search result items, provided by the search engine, that is selected based on the intent of the user.

According to a sixth aspect, the brand classifier component includes a plurality of classifier subcomponents, and the tagging component includes a plurality of tagging subcomponents. Further, the plurality of classifier subcomponents and the plurality of tagging subcomponents form a plurality of pairs of classifier subcomponents and tagging subcomponents that are associated with respective product domains, wherein each classifier subcomponent and tagging subcomponent in a particular pair produces, respectively, a partial classifier result and a partial tagging result. The partial tagging result is based, in part, on the partial classifier result. Further, the tagging output result encompasses a plurality of partial tagging results produced by the respective pairs of classifier subcomponents and tagging subcomponents.

According to a seventh aspect, the method further includes analyzing the plurality of partial tagging results in the tagging output result to produce a final output result, corresponding to a partial tagging result that is determined to be most appropriate.

According to an eighth aspect, the method further includes generating a plurality of feature values associated with the linguistic item. The brand classifier component operates based on a first subset of the plurality of feature values, and while the tagging component operates based on a second subset of the plurality of feature values. Further, the first subset of feature values and the second subset of feature values include a shared set of common feature values. The generating of the plurality of features is performed in such a manner that the common feature values are generated once, so as to reduce latency in generating the common feature values.

According to a ninth aspect, a machine-learning training process is also described herein which includes: (a) generating at least one brand classifier model based on a first group of feature values that, in turn, are generated based on a set of training examples, the brand classifier component being implemented based on the above-referenced at least one brand classifier model; and (b) generating at least one tagging model based on a second group of feature values that, in turn, are generated based on the training examples, the tagging component being implemented based on the above-referenced at least one tagging model. The second group of feature values also includes feature values that are generated based on a classifier output result that is produced by the brand classifier component, in response to processing the training examples.

According to a tenth aspect, the operation of generating of the brand classifier model(s) uses a logistic regression machine-learning technique.

According to an eleventh aspect, the operation of generating of the tagging model(s) uses a conditional random field machine-learning technique.

According to a twelfth aspect, a bootstrapping technique is also described herein which includes: (a) generating a plurality of feature values associated with a set of training examples, wherein at least one feature value, for each particular training example, indicates whether the particular training example specifies a brand that is contained within a brand dictionary; (b) generating at least one brand classifier model based on at least some of the plurality of feature values associated with the training examples, the brand classifier component being implemented based on the brand classifier model(s); (c) using the brand classifier component to determine whether the training examples specify one or more brands that are not currently contained in the brand dictionary; (d) updating the brand dictionary to include the above-referenced one or more brands, to provide an updated brand dictionary; and (e) repeating the generating of the plurality of feature values and generating of the brand classifier model(s) based on the updated brand dictionary, to produce at least one updated brand classifier model.

According to a thirteenth aspect, the operation of generating the plurality of feature values entails generating the feature values based on only a subset of brands specified in the brand dictionary, the subset of brands being less than a full number of brands in the brand dictionary.

According to a fourteenth aspect, a more general method is also described herein for assigning tags to a linguistic item. The method may include the operations of: (a) determining, using at least one machine-trained preliminary classifier component, whether the linguistic item contains at least one candidate item that matches an identified category of tags, to provide a classifier output result; (b) determining, using a machine-trained tagging component, a tag associated with at least one candidate item within the linguistic item, based, at least in part, on the classifier output result, to produce a tagging output result; and (c) generating a result item based, at least in part, on the tagging output result.

According to a fifteenth aspect, the identified category of tags corresponds to a brand-related category.

A sixteenth aspect corresponds to any combination (e.g., any permutation or subset) of the above-referenced first through fifteenth aspects.

According to a seventeenth aspect, one or more computing devices are provided for implementing any of the first through sixteenth aspects.

According to an eighteenth aspect, one or more computer-readable storage mediums are provided that include logic that is configured to implement any of the first through sixteenth aspects.

According to a nineteenth aspect, one or more means are provided for implementing any of the first through sixteenth aspects.

C. Representative Computing Functionality

FIG. 16 shows computing functionality 1602 that can be used to implement any aspect of the system 102 of FIG. 1 or the system 1002 of FIG. 10. For instance, the type of computing functionality 1602 shown in FIG. 16 can be used to implement any of the training systems (104, 1004) of FIGS. 1 and 10, respectively, the search engine 106 of FIG. 1, the application system 1006 of FIG. 10, and so on. In all cases, the computing functionality 1602 represents one or more physical and tangible processing mechanisms.

The computing functionality 1602 can include one or more processing devices 1604, such as one or more central processing units (CPUs), and/or one or more graphical processing units (GPUs), and so on.

The computing functionality 1602 can also include any storage resources 1606 for storing any kind of information, such as code, settings, data, etc. Without limitation, for instance, the storage resources 1606 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1602. The computing functionality 1602 may perform any of the functions described above when the processing devices 1604 carry out instructions stored in any storage resource or combination of storage resources.

As to terminology, any of the storage resources 1606, or any combination of the storage resources 1606, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, each of the specific terms "computer readable storage medium," "computer readable medium device," "computer readable hardware," and "computer readable hardware device" expressly excludes propagated signals per se, while including all other forms of computer readable media.

The computing functionality 1602 also includes one or more drive mechanisms 1608 for interacting with any storage resource, such as a hard disk drive mechanism, an optical disk drive mechanism, and so on.

The computing functionality 1602 also includes an input/output module 1610 for receiving various inputs (via input devices 1612), and for providing various outputs (via output devices 1614). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement and/or orientation detection mechanisms (e.g., accelerometers, gyroscopes, magnetometers, etc.), and so on. One particular output mechanism may include a presentation device 1616 and an associated graphical user interface (GUI) 1618. Other output devices include a printer, a model-generating mechanism, a tactile output mechanism, an archival mechanism (for storing output information), and so on. The computing functionality 1602 can also include one or more network interfaces 1620 for exchanging data with other devices via one or more communication conduits 1622. One or more communication buses 1624 communicatively couple the above-described components together.

The communication conduit(s) 1622 can be implemented in any manner, e.g., by a local area network, a wide area network (e.g., the Internet), point-to-point connections, etc., or any combination thereof. The communication conduit(s) 1622 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1602 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices that implement a latency-efficient system for assigning tags to a linguistic item, comprising:
   a feature generation component configured to generate a plurality of feature values associated with a linguistic item that has been received from a user,
   a machine-trained brand classifier component configured to determine, based on a first subset of the plurality of feature values, whether the linguistic item specifies at least one brand, to provide a classifier output result, the brand classifier component including a plurality of classifier subcomponents;

a machine-trained tagging component configured to determine, based on a second subset of the plurality of feature values, a tag associated with at least one candidate item within the linguistic item, to produce a tagging output result, the tagging component including a plurality of tagging subcomponents, wherein the plurality of classifier subcomponents and the plurality of tagging subcomponents form a plurality of pairs of classifier subcomponents and tagging subcomponents that are associated with respective product domains, wherein each classifier subcomponent and tagging subcomponent in a particular pair produces, respectively, a partial classifier result and a partial tagging result, the partial tagging result being based, in part, on the partial classifier result, wherein the tagging output result encompasses a plurality of partial tagging results produced by the respective pairs of classifier subcomponents and tagging subcomponents;

a post-tagging interpretation component configured to analyze the plurality of partial tagging results, to determine which partial tagging result is most appropriate based on the user's intent, and to produce a final output result corresponding to the partial tagging result that is determined to be most appropriate; and a user interface component to electronically communicate the final output result to the user.

2. The one or more computing devices of claim 1, further comprising an action-taking component that is configured to generate a result item based, at least in part, on the tagging output result.

3. The one or more computing devices of claim 2,
wherein the input linguistic item is a query submitted by the user to a search engine,
wherein the tagging output result reflects an intent of the user in submitting the query, and
wherein the result item is an item, provided by the search engine to the user in response to the query, that is selected based on the intent of the user.

4. The one or more computing devices of claim 3, wherein the final output result is a product page, provided by the search engine, that pertains to a product selected based on the user's intent.

5. The one or more computing devices of claim 1,
wherein the first subset of feature values and the second feature values include a shared set of common feature values, and
wherein the feature generation component is configured to generate the common feature values once, so as to reduce latency in generating the common feature values.

6. A method, implemented by one or more computing devices, for assigning tags to a linguistic item, and performing an action based on the tags, comprising:
receiving an input linguistic item from a user that includes one or more candidate items;
determining, using a machine-trained brand classifier component, whether the linguistic item specifies at least one brand, to provide a classifier output result, wherein the brand classifier component includes a plurality of classifier subcomponents;
determining, using a machine-trained tagging component, a tag associated with at least one candidate item within the linguistic item, to produce a tagging output result, said determining of the tag being based, in part, on the classifier output result, wherein the tagging component includes a plurality of tagging subcomponents;

generating a result item based, at least in part, on the tagging output result;

said receiving, determining whether the linguistic items specifies at least one brand, determining a tag, generating, and electronically communicating being performed by said one or more computing devices, wherein the plurality of classifier subcomponents and the plurality of tagging subcomponents form a plurality of pairs of classifier subcomponents and tagging subcomponents that are associated with respective product domains, wherein each classifier subcomponent and tagging subcomponent in a particular pair produces, respectively, a partial classifier result and a partial tagging result, the partial tagging result being based, in part, on the partial classifier result, and wherein the tagging output result encompasses a plurality of partial tagging results produced by the respective pairs of classifier subcomponents and tagging subcomponents;

analyzing the plurality of partial tagging results in the tagging output result to determine which partial tagging result is most appropriate based on the user's intent;

producing a final output result corresponding to the partial tagging result that is determined to be most appropriate; and electronically communicating the final output result to the user.

7. The method of claim 6, wherein the input linguistic item is a query submitted by the user to a search engine, and
wherein the tagging output result reflects an intent of the user in submitting the query.

8. The method of claim 7, wherein the result item is a product page, provided by the search engine, that pertains to a product that is selected based on the intent of the user.

9. The method of claim 7, wherein the result item is a digital advertisement, provided by the search engine, that is selected based on the intent of the user.

10. The method of claim 7, wherein the result item corresponds to a compilation of search result items, provided by the search engine, that is selected based on the intent of the user.

11. The method of claim 6, further comprising generating a plurality of feature values associated with the linguistic item,
wherein the brand classifier component operates based on a first subset of the plurality of feature values,
wherein the tagging component operates based on a second subset of the plurality of feature values, and
wherein the first subset of feature values and the second subset of feature values include a shared set of common feature values.

12. The method of claim 11, wherein the final output result is a product page, provided by the search engine, that pertains to a product selected based on the user's intent.

13. The method of claim 11,
wherein said generating of the plurality of feature values includes generating the common feature values once, so as to reduce latency in generating the common feature values.

14. The method of claim 6, further comprising, in a machine-learning training process:

generating at least one brand classifier model based on a first group of feature values that are generated based on a set of training examples, the brand classifier component being implemented based on said at least one brand classifier model; and generating at least one tagging model based on a second group of feature values that are generated based on the training examples, the tagging component being implemented based on said at least one tagging model, the second group of feature values also including feature values that are generated based on a classifier output result that is produced by the brand classifier component, in response to processing the training examples.

15. The method of claim 14, wherein said generating of said at least one brand classifier model uses a logistic regression machine-learning technique.

16. The method of claim 14, wherein said generating of said at least one tagging model uses a conditional random field machine-learning technique.

17. The method of claim 6, further comprising, in a machine-learning training process:

generating a plurality of feature values associated with a set of training examples, wherein at least one feature value, for each particular training example, indicates whether the particular training example specifies a brand that is contained within a brand dictionary;

generating at least one brand classifier model based on at least some of the plurality of feature values associated with the training examples, the brand classifier component being implemented based on said at least one brand classifier model;

using the brand classifier component to determine whether the training examples specify one or more brands that are not currently contained in the brand dictionary;

updating the brand dictionary to include said one or more brands, to provide an updated brand dictionary; and repeating said generating of the plurality of feature values and generating of said at least one brand classifier model based on the updated brand dictionary, to produce at least one updated brand classifier model.

18. The method of claim 17, wherein said generating of the plurality of feature values entails generating the feature values based on only a subset of brands specified in the brand dictionary, the subset of brands being less than a full number of brands in the brand dictionary.

19. A device comprising:

a processor; and executable instructions operable by the processor, the executable instructions comprising a method for assigning one or more tags to a linguistic item and performing one or more actions based on the tags, the method comprising:

receiving an input linguistic item from a user that includes one or more candidate items;

determining, using a machine-trained brand classifier component, whether the linguistic item specifies at least one brand, to provide a classifier output result, wherein the brand classifier component includes a plurality of classifier subcomponents;

determining, using a machine-trained tagging component, a tag associated with at least one candidate item within the linguistic item, to produce a tagging output result, said determining of the tag being based, in part, on the classifier output result, wherein the tagging component includes a plurality of tagging subcomponents;

generating a result item based, at least in part, on the tagging output result;

said receiving, determining whether the linguistic items specifies at least one brand, determining a tag, generating, and electronically communicating being performed by said one or more computing devices, wherein the plurality of classifier subcomponents and the plurality of tagging subcomponents form a plurality of pairs of classifier subcomponents and tagging subcomponents that are associated with respective product domains, wherein each classifier subcomponent and tagging subcomponent in a particular pair produces, respectively, a partial classifier result and a partial tagging result, the partial tagging result being based, in part, on the partial classifier result, and wherein the tagging output result encompasses a plurality of partial tagging results produced by the respective pairs of classifier subcomponents and tagging subcomponents;

analyzing the plurality of partial tagging results in the tagging output result to determine which partial tagging result is most appropriate based on the user's intent;

producing a final output result corresponding to the partial tagging result that is determined to be most appropriate; and electronically communicating the final output result to the user.

20. The device of claim 19, wherein the input linguistic item is a query submitted by the user to a search engine, and the tagging output result reflects an intent of the user in submitting the query.

* * * * *